(12) United States Patent
King et al.

(10) Patent No.: US 10,099,518 B2
(45) Date of Patent: Oct. 16, 2018

(54) CENTRAL TIRE INFLATION SYSTEM AND METHOD

(71) Applicant: Jaguar Land Rover Limited, Whitley, Coventry, Warwickshire (GB)

(72) Inventors: Paul King, Loughborough (GB); Emma-Claire Dunning, Coventry (GB); Robbie Lesbirel, Leamington Spa (GB); Maelle Dodu, Leamington Spa (GB); Thuy-Yung Tran, Rugby (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 137 days.

(21) Appl. No.: 15/312,410

(22) PCT Filed: Apr. 10, 2015

(86) PCT No.: PCT/EP2015/057893
§ 371 (c)(1),
(2) Date: Nov. 18, 2016

(87) PCT Pub. No.: WO2015/176869
PCT Pub. Date: Nov. 26, 2015

(65) Prior Publication Data
US 2017/0080761 A1    Mar. 23, 2017

(30) Foreign Application Priority Data

May 20, 2014  (GB) .................................. 1408916.3

(51) Int. Cl.
*B60C 23/00*    (2006.01)
(52) U.S. Cl.
CPC .................................. *B60C 23/003* (2013.01)

(58) Field of Classification Search
None
See application file for complete search history.

(56) References Cited

U.S. PATENT DOCUMENTS

| 4,898,216 A | 2/1990 | Schultz et al. |
| 5,516,379 A | 5/1996 | Schultz |

(Continued)

FOREIGN PATENT DOCUMENTS

| EP | 0344002 A2 | 5/1988 |
| EP | 0707987 A1 | 10/1994 |

(Continued)

OTHER PUBLICATIONS

Search Report for application No. GB1408916.3, dated Nov. 24, 2014, 6 pages.

(Continued)

*Primary Examiner* — Redhwan K Mawari
*Assistant Examiner* — Edward Torchinsky
(74) *Attorney, Agent, or Firm* — Reising Ethington P.C.

(57) ABSTRACT

A processor for controlling operation of a central tire inflation system. The processor controls the central tire inflation system to inflate a vehicle tire from a current tire pressure to a target tire pressure. The processor is configured to generate one or more output signals to cause the central tire inflation system to supply compressed air to inflate the tire from said current tire pressure to the target tire pressure in at least first and second stages. In the first stage, the central tire inflation system supplies compressed air to inflate the tire from the current tire pressure to an intermediate tire pressure. In the second stage, the central tire inflation system supplies compressed air to inflate the tire from the intermediate tire pressure to the target tire pressure. The first and second stages of the inflation are discrete from each other.

15 Claims, 16 Drawing Sheets

(56) References Cited

U.S. PATENT DOCUMENTS

```
    6,244,316  B1      6/2001  Naedler
    8,794,280  B2      8/2014  Flory et al.
2013/0293371  A1     11/2013  Patel et al.
2013/0325261  A1*    12/2013  Hansen ................ B60C 23/001
                                                              701/36
```

FOREIGN PATENT DOCUMENTS

```
EP         1099574  A1      5/2001
EP         2572903  A1      8/2012
FR         2943277  A1      9/2010
```

OTHER PUBLICATIONS

International Search Report for International application No. PCT/EP2015/057893, dated Jul. 10, 2015, 6 pages.
Written Opinion for International application No. PCT/EP2015/057893, dated Jul. 10, 2015, 8 pages.

\* cited by examiner

Table 1. Deflation Cycle - All 4 Tyres

| | Inflate/Deflate 4 Tyres | Measure/Latch FL | Measure/Latch FR | Measure/Latch RL | Measure/Latch RR | Total Cycles |
|---|---|---|---|---|---|---|
| | Deflation of all 4 tyres to 1.5 bar | | | | | |
| Output FL | | | | | | 2 |
| Output FR | | | | | | 2 |
| Output RL | | | | | | 2 |
| Output RR | | | | | | 2 |
| Inlet LF/HP | | | | | | 0 |
| Inlet HF/LP | 1 | | 1 | 1 | 1 | 5 |
| Exhaust 1 | 1 | 1 | | 1 | 1 | 5 |
| Exhaust 2 | 1 | 1 | 1 | 1 | 1 | 5 |

Fig 8

Table 2. Deflation Cycle - All 4 Tyres Individually Deflated

| | Inflate/Deflate 4 Tyres | Measure/Latch FL | Measure/Latch FR | Measure/Latch RL | Measure/Latch RR | Total Cycles |
|---|---|---|---|---|---|---|
| | Deflation each tyre back to 2.3 Front Axle and 2.5 Rear Axle | | | | | |
| Output FL | 2 | | | | | 3 |
| Output FR | 2 | | | | | 3 |
| Output RL | 2 | | | | | 3 |
| Output RR | 2 | | | | | 3 |
| Inlet LF/HP | 1 | | | | | 0 |
| Inlet HF/LP | 1 | | 1 | 1 | 1 | 5 |
| Exhaust 1 | 1 | 1 | | 1 | 1 | 5 |
| Exhaust 2 | 1 | 1 | 1 | 1 | 1 | 5 |

| Usage Type | | Number of Occurrences (per year) | Tyre Pressure Change | Output RL (per year) | Output FR (per year) | Output RL (per year) | Output RR (per year) | Inlet LFRP (per year) | Inlet HFRP (per year) | Exhaust 1 (per year) | Exhaust 2 (per year) | Annual Valve Operation |
|---|---|---|---|---|---|---|---|---|---|---|---|---|
| Off Road | Sand | 48 | + 1bar | 288 | 288 | 288 | 288 | 624 | 288 | 912 | 912 | 3888 |
| | Wet Grass | 24 | + 1bar | 144 | 144 | 144 | 144 | 312 | 144 | 456 | 456 | 1944 |
| | Mud | 24 | + 1bar | 144 | 144 | 144 | 144 | 312 | 144 | 456 | 456 | 1944 |
| | Snow | 180 | + 1bar | 1080 | 1080 | 1080 | 1080 | 2340 | 1080 | 3420 | 3420 | 14580 |
| On Road | ECO | 50 | -0.5bar | 250 | 250 | 250 | 250 | 450 | 200 | 650 | 650 | 2950 |
| | High Speed | 50 | -0.3bar | 250 | 250 | 250 | 250 | 450 | 200 | 650 | 650 | 2950 |
| | GVW | 50 | -0.5bar | 250 | 250 | 250 | 250 | 450 | 200 | 650 | 650 | 2950 |
| | Towing | TBD | -0.5bar | | | | | | | | | 0 |
| Tyre Pressure Maintenance | | 12 | +0.1bar | 24 | 24 | 24 | 24 | 48 | 48 | 96 | 96 | 384 |

Total Valve Operation (per year) — 31590

Fig 12

CENTRAL TIRE INFLATION SYSTEM AND METHOD

TECHNICAL FIELD

The present invention relates to a central tire inflation system (CTIS) and to a related method. The present invention also relates to a processor for controlling operation of a central tire inflation system (CTIS) to inflate at least one tire of a vehicle and to a related method. The present invention also relates to an electronic controller, or electronic control unit (ECU); to a vehicle; and to related computer program products.

BACKGROUND

Central tire inflation systems (CTISs) were originally developed for military applications, in particular for military applications concerning off-road military wheeled trucks and trailers. However, CTISs are nowadays incorporated into non-military vehicles such as specialist construction equipment and some agricultural vehicles.

A CTIS typically comprises a compressed air source located on-board the vehicle and connected to one or more tires. Tire pressure can therefore be adjusted by operating the CTIS. The CTIS delivers compressed air to tire supply lines. In some examples, the supply lines are integrated into the vehicle axles. Various valves are provided in the CTIS to control flow of compressed air.

At least in certain embodiments, the present invention aims to solve, or at least mitigate, at least some problems that can be identified in the prior art, and/or to provide an improved CTIS and/or CTIS control strategy compared to the prior art.

SUMMARY OF THE INVENTION

Aspects of the present invention relate to a CTIS; to a vehicle; to a related method; and to a related computer program product. Aspects of the present invention also relate to a processor; to an ECU; to a CTIS; to a vehicle; to a related method; and to a related computer program product.

According to another aspect of the present invention, there is provided a processor for controlling operation of a central tire inflation system (CTIS) to inflate a tire of a vehicle from a current tire pressure to a target tire pressure, said processor being configured to generate one or more output signals to cause the CTIS to supply compressed air to inflate the tire from said current tire pressure to said target tire pressure in at least first and second stages; the processor being configured to control the CTIS to supply compressed air to said tire during said first stage to inflate the tire from said current tire pressure to an intermediate tire pressure; and to supply compressed air to said tire during said second stage to inflate the tire from said intermediate tire pressure to said target tire pressure; wherein said first and second stages are discrete from each other. The first and second stages do not form a continuous inflation cycle. Rather, the inflation cycle is interrupted and is performed in said first and second stages.

By first inflating the tire in two or more stages, the tire can reach an operating pressure more expediently. The vehicle may thereby be readied for use more quickly, for example when transitioning from an off-road operating mode (which typically utilizes a relatively low tire pressure) to an on-road operating mode (which typically utilizes a relatively high tire pressure). If the intermediate tire pressure is set as a pressure which allows the vehicle to be driven on-road, the vehicle can be made operational more quickly.

The processor can be configured to perform said first stage on each of a plurality of tires to inflate each of said tires from their respective current tire pressures to said intermediate tire pressure. The processor can be configured to perform said second stage on each of said plurality of tires to inflate each of said tires from said intermediate tire pressure to said target tire pressure.

The processor can control the CTIS to cause the tire pressure to reach, or at least substantially reach, the target tire pressure by supplying compressed air to the tire in two or more stages, or, in other words, in two or more tranches.

The processor can be configured to control the CTIS on a vehicle having more than one tire. For example, the vehicle can have four tires; two front tires mounted on a front axle and two rear tires mounted on a rear axle. The processor can be configured to control the CTIS to inflate one or more tires at a time. In particular, the processor can control the CTIS to simultaneously inflate all of the tires of the vehicle, or to simultaneously inflate two or more tires connected to a same axle of the vehicle.

The tires can be disposed on different axles. For example, the vehicle can comprise front and rear axles. The processor can implement a staggered tire inflation strategy to inflate the tires on each axle in sequence. The processor can be configured to inflate the tires on the rear axle to the target tire pressure before the tires on the front axle are inflated to the target tire pressure. For example, the tires on the rear axle could be inflated from the intermediate tire pressure to the target tire pressure before the tires on the front axle are inflated from the intermediate tire pressure to the target tire pressure. This approach can help to preserve the dynamic stability or handling balance of the vehicle. In particular, by inflating the tires mounted to the rear axle to the target tire pressure and then inflating the tires mounted to the front axle to the target tire pressure, the handling characteristics of the vehicle can, for example, be biased towards understeer. This approach is advantageous if the CTIS is to operate when the vehicle is moving. The target tire pressure of the tires on the front axle could be different from the target tire pressure of the tires on the rear axle. The tires on the rear axle could be inflated from the current (initial) tire pressure to the intermediate tire pressure before the tires on the front axle are inflated from the current (initial) tire pressure to the intermediate tire pressure. The tire pressure of the tires on the rear axle can thereby be increased before the tires on the front axle. Once all of the tires are at said intermediate pressure, the pressure of the rear tires can be increased to the (final) target tire pressure before increasing the pressure of the front tires to the (final) target tire pressure.

The intermediate tire pressure can be predefined or could be calculated. The processor can be configured to measure the tire pressure between said first and second stages. The processor can receive a first input signal representative of a current tire pressure of the tire. The processor can receive a second input signal representative of a target tire pressure for the tire.

The processor can be configured to generate one or more output signals to control operation of the CTIS, for example by activating one or more inlet valves and/or one or more outlet valves. The inlet valve(s) and/or the outlet valve(s) can, for example, be disposed in a valve block. A compressor or reservoir can supply compressed air to a gallery in the valve block. The operation of the compressor could optionally also be controlled by the processor.

The processor can be configured to generate one or more output signals to cause the CTIS to supply compressed air to the tire for two or more discrete stages to reach the target tire pressure. A first volume of compressed air can be supplied to the tire during a first one of said stages. A second volume of compressed air can be supplied to the tire during a second one of said stages. The first and second volumes of compressed air can be the same or different.

The CTIS can be operated or configured to supply compressed air to the tire for a defined time interval during each said at least first and second stages. The time intervals can be stored in a look-up table stored on a memory. Alternatively, the time intervals can be calculated by an algorithm, for example based on the current tire pressure and the target tire pressure. Said time intervals can be representative of respective quantities of compressed air to be supplied to the tire. Said time intervals can depend on the pressure of the compressed air supplied by the CTIS to inflate the tire. Said time intervals can each be proportional to a respective pressure differential achieved in the tire after each time interval.

The CTIS can be configured to control the supply of compressed air in said first and second stages based on a measured pressure. For example, a pressure sensor can be provided for measuring the pressure in each tire. The pressure sensor can be configured to output pressure measurement data to enable the tire pressure to be monitored substantially in real time. When the tire pressure substantially matches the intermediate tire pressure, the CTIS can terminate the first stage of tire inflation. When the tire pressure substantially matches the target tire pressure, the CTIS can terminate the second stage of tire inflation.

The CTIS can be configured to estimate a volume of compressed air delivered to each tire (or each group of tires) during said first stage and/or said second stage. An estimation of the tire pressure could be determined based on the volume and pressure of air delivered during said first stage and/or said second stage. A pressure sensor and a flow sensor can be provided in a tire supply line associated with the or each tire. The measurement data from said sensors can be used together with time to calculate the volume of air that has been delivered to each tire. Alternatively, or in addition, an estimation of the air flow to each tire can be determined based on one or more operating parameters of a compressor. For example, the volume of compressed air delivered can be estimated based on the run time of the compressor together with the current/voltage drawn by the first compressor. The estimation can also use a measured pressure in a fluid gallery, for example in the valve block. The estimation may also use additional information relating to ambient air temperature and/or pressure. Rather than a compressor, the compressed air could be supplied from a reservoir.

The processor can be configured to generate at least one signal to operate the CTIS to inflate said tire from the current tire pressure to the intermediate tire pressure for a first time interval. The processor can be configured to generate at least one signal to operate the CTIS to inflate said tire from the intermediate tire pressure to the target tire pressure for a second time interval. The first and second time intervals can each be predetermined according to one or more calibration procedures. The intermediate tire pressure can be the same for each tire or can be different for each tire. In an embodiment, the target tire pressure and/or the intermediate tire pressure for the tires on a front axle can be different from the target tire pressure and/or the intermediate tire pressure for the tires on a rear axle. In an embodiment, the target tire pressures and/or the intermediate tire pressure for all the tires connected to a vehicle axle are the same. The same signal can instruct both these inflation operations.

A time gap can be introduced between said first and second stages. The time gap can, for example, last 2 seconds or longer. This time gap could be used by the processor to instruct the CTIS to perform a measurement of the current tire pressure in one or more of the tires being inflated to verify whether the intended intermediate tire pressure has been obtained during said first stage.

The intermediate tire pressure(s) can be at least substantially equal to a legally required minimum tire pressure. The legally required minimum tire pressure will depend on a number of factors according to tire standards such as the tire specification, the size and weight of the vehicle and the maximum vehicle speed. In one example, the minimum tire pressure for a three (3) tonne four (4) wheel drive vehicle can be 2 bar. This minimum tire pressure can relate to an on-road condition for the vehicle. This minimum tire pressure can be the same or it can be different for different axles of the vehicle.

The processor can simultaneously command tire inflation of one or more tires of the vehicle. Compressed air can simultaneously be supplied to said one or more tires. In particular, tires connected to a same axle can be simultaneously inflated. It will be understood that different tires can have different current tire pressures. The target tire pressure(s) and the intermediate tire pressure(s) can be the same or they can be different for different tires.

In an embodiment, the CTIS can inflate all of the tires of the vehicle to the respective intermediate tire pressures. Subsequently, the CTIS can inflate all of the tires of the vehicle to the respective target tire pressures.

It will be understood that the processor can be part of an electronic controller also known as an electronic control unit (ECU). The ECU can be configured, or predisposed, to control the CTIS.

In some embodiments, the target tire pressure(s) and/or the intermediate tire pressure(s) can be input for one or more of the tires by a driver. Alternatively, the target and/or intermediate tire pressure(s) can be automatically selected depending on a vehicle driving mode. The vehicle driving mode can be manually entered by the driver through a human-to-machine interface (HMI), or it can be automatically detected by a vehicle control system. The vehicle control system can comprise a plurality of ECUs. The target and/or intermediate tire pressure(s) can be input to the vehicle control system via one or more of the ECUs. The vehicle control system can transmit a signal representative of said target and/or intermediate tire pressure(s) to the processor as described herein, or to the ECU comprising said processor.

The processor can be configured to generate one or more control signals to control one or more of the following:

a first compressed air source and/or a first inlet valve operably coupled to said first compressed air source;

a second compressed air source and/or a second inlet valve operably coupled to second compressed air source; and an outlet valve for supplying compressed air from a fluid gallery.

The processor can be coupled to one or more memories storing data representative of the current and/or target and/or intermediate tire pressure(s). The data can be stored in one or more look-up tables as described herein.

According to another aspect of the present invention, there is provided an ECU for controlling a CTIS, the ECU comprising a processor as described herein.

According to another aspect of the present invention, there is provided a CTIS comprising a processor as described herein, or an ECU as described herein.

According to another aspect of the present invention, there is provided a vehicle comprising a CTIS as described herein.

According to another aspect of the present invention, there is provided a method of operating a CTIS to inflate a tire of a vehicle from a current tire pressure to a target tire pressure, the method comprising the step of: using a processor, generating at least one signal to cause the CTIS to supply compressed air to inflate said tire to an intermediate tire pressure in a first stage, and to cause the CTIS subsequently to supply compressed air to inflate said tire to the target tire pressure in a second stage. The first and second stages are discrete from each other. In other words, the first and second stages are not performed in a continuous cycle. The intermediate tire pressure can be predefined; or could be generated dynamically based on the current tire pressure and/or the target tire pressure.

The method can comprise measuring the tire pressure before the first stage commences. The first stage of the tire inflation can be controlled based on the measured tire pressure. The method can comprise measuring the tire pressure after the first stage has been completed and before the second stage commences. The second stage of the tire inflation can be controlled based on the measured tire pressure after the first stage.

The method can further comprise the step of: receiving a first signal representative of the current tire pressure of said tire. The method can further comprise the step of: receiving a second signal representative of the target tire pressure for said tire.

During the first stage, the CTIS can supply compressed air to said tire for a first time interval. During the second stage, the CTIS can supply compressed air to said tire for a second time interval. The first time interval and/or the second time interval can be calculated dynamically; or can be determined with reference to a look-up table. The first and second time intervals can be the same or different.

The processor can generate a first output signal to cause the CTIS to inflate said tire from the current tire pressure to the intermediate tire pressure. The processor can generate a second output signal to cause the CTIS to inflate said tire from the intermediate tire pressure to the target tire pressure.

The CTIS can be operated to inflate a plurality of tires. At least one of said tires can be provided on a front axle of the vehicle; and at least one of said tires can be provided on a rear axle of the vehicle. A staggered tire inflation strategy can be implemented. Each tire on the rear axle can be inflated to the intermediate tire pressure before each tire on the front axle is inflated to the intermediate tire pressure. Alternatively, or in addition, each tire on the rear axle can be inflated from the intermediate tire pressure to the target tire pressure before each tire on the front axle is inflated from the intermediate tire pressure to the target tire pressure.

According to another aspect of the present invention, there is provided a computer program product comprising a computer readable storage medium including computer readable program code, wherein the computer readable program code when executed causes a CTIS to implement a method as described herein.

As used throughout the application, the singular form of "a", "an" and "the" may include plural referents unless the context clearly dictates otherwise.

For the avoidance of doubt, references herein to a central tire inflation system (CTIS) are to an apparatus for controlling the pressure of one or more tires.

Within the scope of this application it is expressly intended that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

One or more embodiments of the present invention will now be described, by way of example only, with reference to the accompanying Figures, in which:

FIG. 10 is a vehicle system boundary diagram representing the CTIS shown in FIGS. 1A and 1B;

FIG. 8 is a table showing the status of the valves of the CTIS described herein through a tire deflation cycle involving simultaneous deflation of all four tires;

FIG. 9 is a table showing the status of the valves of the CTIS described herein through a tire deflation cycle involving one tire at a time;

FIG. 10 is a table showing the status of the valves of the CTIS described herein through a tire inflation cycle which switches the tire pressures from those relating to an off road driving mode to those relating to an on road driving mode;

FIG. 11 is a table showing the status of the valves of the CTIS described herein through a tire inflation cycle involving one tire at a time;

FIG. 12 is a table showing an estimated annual valve usage for the valves of the CTIS described herein;

DETAILED DESCRIPTION

Figure 1A:
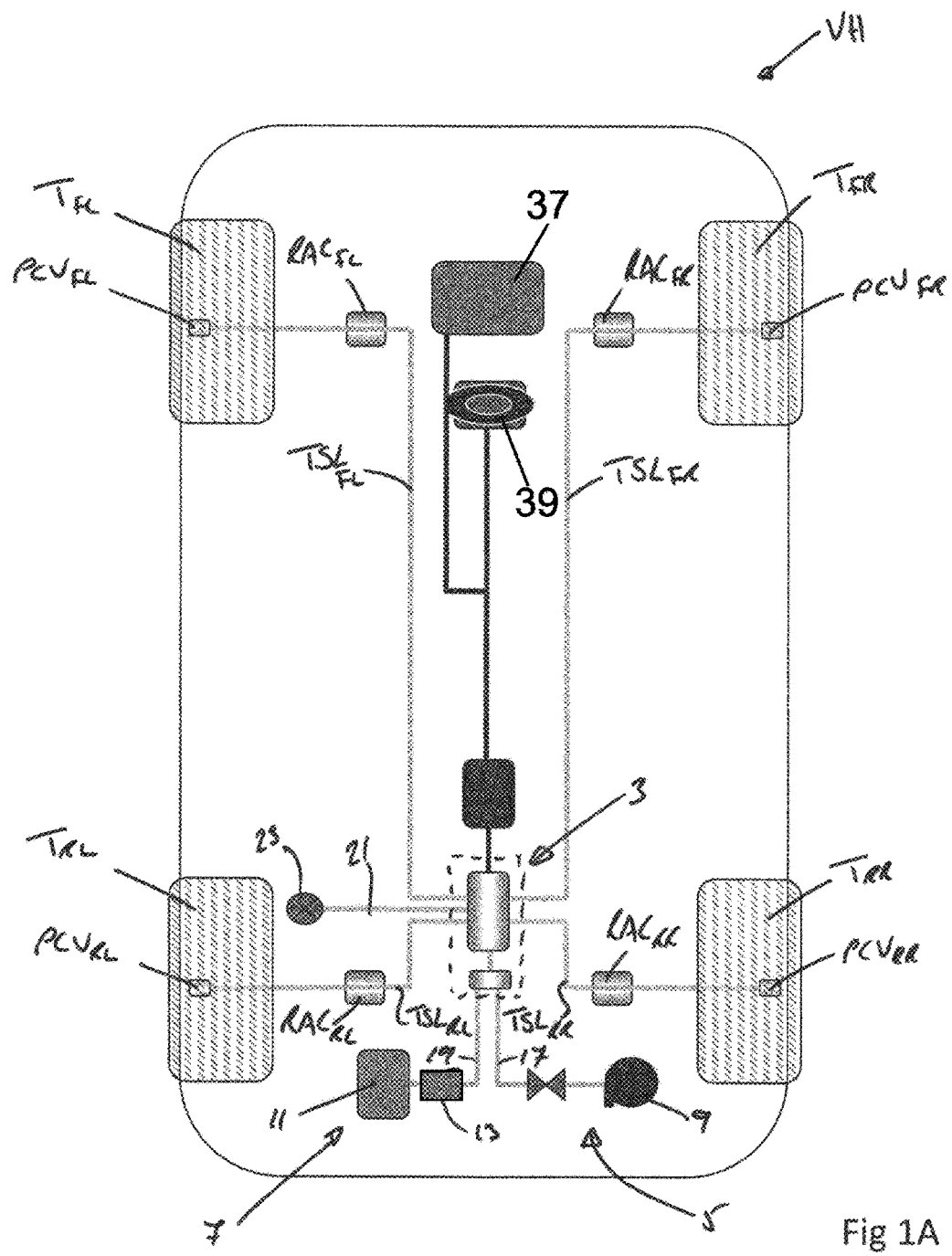
FIG. 1A is a schematic representation of a central tire inflation system (CTIS) according to an embodiment of the invention.

In the following description and in the drawings, reference letters are used to collectively or un-specifically identify equivalent or essentially equivalent components. Where necessary, a specific component in a collection of equivalent or essentially equivalent components is identified by suffixing a reference letters in subscript format.

A central tire inflation system (CTIS) 1 in accordance with an embodiment of the present invention will now be described with reference to the accompanying Figures. As shown schematically in FIG. 1A, the CTIS 1 is installed in a vehicle VH having four wheels W each having a tire T mounted on a wheel hub (not shown). The wheels W (and the tires T) are identified herein based on their relative position on the vehicle VH, namely: front left (FL), front right (FR), rear left (RL) and rear right (RR). This nomenclature is employed to identify the components of the CTIS 1 associated with the respective tires T. The front tires $T_{FR}$, $T_{FL}$ are mounted on a front axle and the rear wheels $T_{RR}$, $T_{RL}$ are mounted on a rear axle of the vehicle.

The CTIS 1 comprises four pneumatic control valves PCV fixedly mounted to the wheel hubs and arranged to control the supply of compressed air to and from a respective tire cavity. The pneumatic control valves PCV are pneumatically operated in response to changes in the pressure in the associated tire supply line TSL. Specifically, the pneumatic control valves PCV are operable to cycle sequentially (i.e. to toggle) between an open state and a closed state in response to the application of a pressure exceeding a valve activation pressure. The pneumatic control valves PCV are stable in both the open and closed state via a latching mechanism, i.e. they can each be considered as a pressure actuated bi-stable valve. Herein the application of air at a pressure and time sufficient to switch the valve from one state to its other state, i.e. from open to closed or from closed to open, is referred to as "toggling" the valve, and the application of said air in this manner is referred to as a high pressure (pneumatic) control signal. A suitable pneumatic control valve PCV for this application is available in the form of a pneumatic latching valve from Norgren Limited of PO Box 22, Eastern Avenue, Lichfield, Staffordshire, WS13 6SB, United Kingdom. UK Patent application GB 1313622.1 filed on 30 Jul. 2013, the description of which is appended hereto, and the contents of which are incorporated herein by reference in their entirety, describes such pneumatic latching valves. It will be appreciated that each pneumatic control valve could have additional operating states which are cycled through sequentially in dependence on said pneumatic control signal.

The CTIS 1 further comprises a valve block 3 for controlling the supply of compressed air to each of the pneumatic control valves PCV. The valve block 3 is fluidly coupled to a first compressed air source 5 and a second compressed air source 7. The first compressed air source 5 provides air at a high flow rate and low pressure (HF/LP); and the second compressed air source 7 is operable to provide air at a higher pressure. As described herein, the first and second compressed air sources 5, 7 are distinct from each other. In the present embodiment, the first compressed air source 5 comprises a first compressor 9; and the second compressed air source 7 comprises a second compressor 11 and a reservoir 13.

The activation pressure of each said pneumatic control valve PCV is below the pressure of the second compressed air source 7. In this manner the second compressed air source 7 can be applied for a short duration to switch one or more selected pneumatic control valves PCV from a closed state to an open state, and vice versa.

An ECU 15 is provided to control operation of the CTIS 1. Specifically, the ECU 15 is configured to control operation of the valve block 3 and the first compressor 9. The second compressor 11 forms part of the vehicle air suspension and could be controlled indirectly by the ECU 15.

A tire supply line TSL is provided to supply compressed air from the valve block 3 to each tire T. Specifically, the CTIS 1 comprises a front left tire supply line $TSL_{FL}$, a front right tire supply line $TSL_{FR}$, a rear left tire supply line $TSL_{RL}$ and a rear right tire supply line $TSL_{RR}$. The pneumatic control valves PCV are provided at the ends of the tire supply lines TSL to control the supply of compressed air to the respective tires T. A section of each tire supply line TSL extends along the respective vehicle axles to supply compressed air to the pneumatic control valves PCV mounted in each wheel hub. A rotary air coupling (RAC) is provided in each tire supply line TSL to provide a fluid coupling to supply compressed air from the valve block 3 to the section of each tire supply line TSL disposed in the vehicle axle.

The valve block 3 will now be described in more detail with reference to FIG. 1B. The valve block 3 comprises first and second inlet valves $V_{INC}$, $V_{INSS}$. The first inlet valve $V_{INC}$ operatively controls the supply of compressed air from the first compressed air source 5 which is connected to the valve block 3 by a first supply line 17. The second inlet valve $V_{INSS}$ operatively controls the supply of compressed air from the second compressed air source 7 which is connected to the valve block 3 by a second supply line 19.

The valve block 3 comprises four outlet valves (collectively referenced as $V_O$) for controlling the supply of compressed air to the respective tire supply lines TSL. In particular, the valve block 3 comprises: a front left outlet valve $V_{FLO}$ for controlling the supply of compressed air to the front left tire supply line $TSL_{FL}$; a rear left outlet valve $V_{RLO}$ for controlling the supply of compressed air to the rear left tire supply line $TSL_{RL}$; a front right outlet valve $V_{FRO}$ for controlling the supply of compressed air to the front right tire supply line $TSL_{FR}$; and a rear right outlet valve $V_{RRO}$ for controlling the supply of compressed air to the rear right air supply line $TSL_{RR}$. The outlet valves $V_O$ are operable independently of each other to enable the selective supply of compressed air to one or more of the tire supply lines TSL.

The valve block 3 also comprises first and second exhaust valves $E_1$, $E_2$ coupled to an exhaust line 21. The exhaust line 21 terminates with an exhaust outlet 23 which is open to atmosphere to vent exhaust air from the CTIS 1. The first and second exhaust valves $E_1$, $E_2$ are operable to control the flow of exhaust air to the exhaust line 21, for example during tire deflation. A safety valve $V_{SAFE}$ is also provided in the valve block 3. The safety valve $V_{SAFE}$ is operable to vent to atmosphere any excess air which might accumulate in the valve block 3 due, for example, to malfunction of any of the components of the CTIS 1.

The inlet valves $V_{INC}$, $V_{INSS}$, the outlet valves $V_O$ and the exhaust valves $E_1$, $E_2$ are solenoid valves having a normally-closed configuration (illustrated by a filled symbol in FIG.

1B). The inlet valves $V_{INC}$, $V_{INSS}$, the outlet valves $V_O$ and the exhaust valves $E_1$, $E_2$ are operable independently of each other and are actuated by control signals received from the ECU 15. The safety valve $V_{SAFE}$ is also a solenoid valve but has a normally-open configuration (illustrated by an open symbol in FIG. 1B). The safety valve $V_{SAFE}$ is closed by receiving a control signal from the ECU 15.

The first compressor 9 is a dedicated compressor for the CTIS 1. The second compressor 11 forms part of an air suspension system (not shown). The first and second compressors 9, 11 are controlled, directly or indirectly, by the ECU 15. The first compressor 9 comprises an electric motor 27 and has an operating pressure of approximately 9 bar. A dryer unit 29 is coupled to the compressor 9 partway through a first compressed air supply line 31 connecting the first compressor 9 to the valve block 3. The air suspension system comprises pneumatic actuators (not shown) which connect the chassis (not shown) of the vehicle VH to the wheels W. The pneumatic actuators are operable to maintain the vehicle at a target ride height and optionally also to request ride height changes (for example to improve off-road performance or ease of access/loading). Compressed air at a pressure of up to 20 bar is stored in the reservoir 13.

A fluid gallery 33 is provided in the valve block 3. The gallery 33 is open to each of: the outlet valves $V_O$, the inlet valves $V_{INC}$, $V_{INSS}$, the exhaust valves $E_1$, $E_2$, and the safety valve $V_{SAFE}$. The valve block 3 houses a pressure sensor 35 arranged to measure the pressure in a gallery 33. The gallery 33 can be selectively placed in fluid communication with one or more of the tire supply lines TSL by opening one or more of the outlet valves $V_O$. In the present embodiment, the pressure sensor 35 measures the pressure in the individual tire supply lines TSL by placing the tire supply line TSL in fluid communication with the gallery 33. By opening the pneumatic control valve PCV associated with that tire supply line TSL, the pressure sensor 35 can measure the air pressure in the tire cavity (hereinafter referred to, for simplicity, as the tire pressure).

The gallery 33 receives compressed air from each of said first and second compressed air sources 9, 11 via the respective first and second inlet valves $V_{INC}$, $V_{INSS}$. The first inlet valve $V_{INC}$ is operable to control the supply of compressed air from the first compressed air source 5 to the gallery 33. The second inlet valve $V_{INSS}$ is operable to control the supply of compressed air from the second compressed air source 7 to the gallery 33. In use, the first compressed air source 5 is the primary source of compressed air for inflating the tires T. One or more of the tire supply lines TSL can be placed in communication with the first compressed air source 5 by opening the first inlet valve $V_{INC}$ and the appropriate outlet valves $V_O$. The second compressed air source 7 provides a higher pressure supply which is controlled by the second inlet valve $V_{INSS}$ to generate a pneumatic control signal as described above for controlling operation of one or more of said pneumatic control valves PCV to tires for which the respective outlet valves $V_O$ are open, i.e. to toggle the valves from one stable state to the other stable state. Specifically, the second inlet valve $V_{INSS}$ is operated to generate the pneumatic control signal to cycle the pneumatic control valve(s) PCV in communication with the gallery 33. The pneumatic control valve(s) PCV cycle through their respective operating states in response to the pneumatic control signal and, therefore, can be operated to control the supply of compressed air to and from the respective tires T. By opening the pneumatic control valve(s) PCV, one or more of the tires T can be placed in communication with the respective tire supply lines TSL. The valve block 3 can be operated to place the tire supply lines TSL in communication with the first compressed air source 5 to inflate one or more of said tires T; or in communication with the exhaust line 21 to deflate one or more of said tires T. Furthermore, the valve block 3 can be operated to measure the pressure of the air in the tires T.

To measure an individual tire pressure of a wheel having a closed PCV, the valve block 3 is operated to close the first and second inlet valves $V_{INC}$, $V_{INSS}$, and the exhaust valves $E_1$, $E_2$. The outlet valve $V_O$ corresponding to the tire supply line TSL for the particular tire is opened to place the tire supply line TSL in fluid communication with the gallery 33. A pneumatic control signal is then generated by operating the second inlet valve $V_{INSS}$ to open the pneumatic control valve PCV for that tire T. The tire T is thereby placed in communication with the gallery 33 via the corresponding tire supply line TSL. The pressure sensor 35 then measures the air pressure in the gallery 33 to determine the tire pressure for that particular tire T. Once the pressure has been measured, if no further action is required in relation to that tire a pneumatic control signal may be generated by operating the second inlet valve $V_{INSS}$ to close the pneumatic control valve PCV.

The CTIS 1 according to the present embodiment uses a single pressure sensor 35 for measuring the pressure in the gallery 33. It will be appreciated that more than one pressure sensor 35 could be provided. For example, a pressure sensor 35 could be provided in communication with each tire supply line TSL. Equally, a separate valve block 3 could be provided for each tire T or for each axle.

The ECU 15 is programmed to control the overall operation of the CTIS 1. The ECU 15 is configured to determine an inflation time or a deflation time. The inflation time is the period of time over which compressed air must be supplied from the first compressed air source 5 to the one or more tire(s) T to reach the target tire pressure. The inflation time is a function of one or more of the following: the pressure differential between the target tire pressure and the current tire pressure (the current tire pressure being the tire pressure prior to inflation); the operating characteristics of the first compressed air source (e.g. nominal pressure and flow rate); the number of tires T which are being inflated at any given time (if more than one tire T can be inflated simultaneously); and the volume and/or temperature of the tire cavities. It will be appreciated that is not necessarily equivalent to a compressor run time as the compressed air generated by the first compressor 9 is buffered in the first reservoir.

The deflation time is the period of time over which compressed air must be vented from the one or more tire(s) T through the first and second exhaust valves $E_1$, $E_2$ to reach the target tire pressure. The deflation time is also a function of the number of tires T being simultaneously deflated, of the current tire pressure (i.e. the tire pressure before deflation), of the target tire pressure and/or the pressure differential to be achieved by tire deflation and/or of the volume and/or temperature of the tire cavities.

In the present embodiment, the ECU 15 retrieves the inflation time and/or the deflation time from a look-up table stored in a memory device accessible to the ECU 15. The look-up table can take the form of a double entry table indexed according to the current tire pressure and the target tire pressure. Based on the current tire pressure and the target tire pressure, the ECU 15 can retrieve from the look-up table a value corresponding to, or representative of, the predetermined tire inflation time for a given flow rate and air supply air pressure. Alternatively the look-up table may give a volume of air required and the ECU calculates the inflation time based on measured or estimated pressures and flow rates and the retrieved volumetric air requirement. Other methods may be useful.

The ECU 15 controls tire inflation and/or deflation by opening and closing, as appropriate, the various valves $V_O$, $V_{INO}$, $V_{INSS}$, $E_1$, $E_2$ of the valve block 3. Tire inflation and deflation can thus potentially be performed one tire T at a time, or according to any combination of tires T simultaneously. In the present embodiment, however, the ECU 15 is programmed to simultaneously deflate all the tires T, or in pairs, and to inflate the tires T one at a time or, simultaneously in pairs. If deflated/inflated in pairs, the pairs of tires T are selected according to their location at the front or rear of the vehicle VH. In this event, the tires T are said to be deflated/inflated by the CTIS 1 'per axle'.

In the present embodiment, the ECU 15 uses an algorithm to refer the current and target tire pressures to a nominal tire temperature of 25° C. and to the case of tire inflation of an individual tire T. Alternatively, different look-up tables each corresponding to a tire temperature and/or to the case of tire inflation for two or more tires T could be used. Compressed air losses in the CTIS 1 may affect the period of time taken for the CTIS 1 to achieve a predetermined pressure. The values stored in the look-up table could be dynamically updated to take into account the effects of said losses. The values could, for example, be updated via one or more self-learning algorithms.

The ECU 15 is in addition configured to provide information relating to the status and/or operation of the CTIS 1 to a vehicle user via a human-machine interface (HMI) 37. A dashboard (not shown) of the vehicle VH is in addition equipped with a visual output, for example a tire operation dial 39, to provide a user with information as to whether compressed air is being supplied to, or exhausted from, the tire cavities.

Figure 1B:
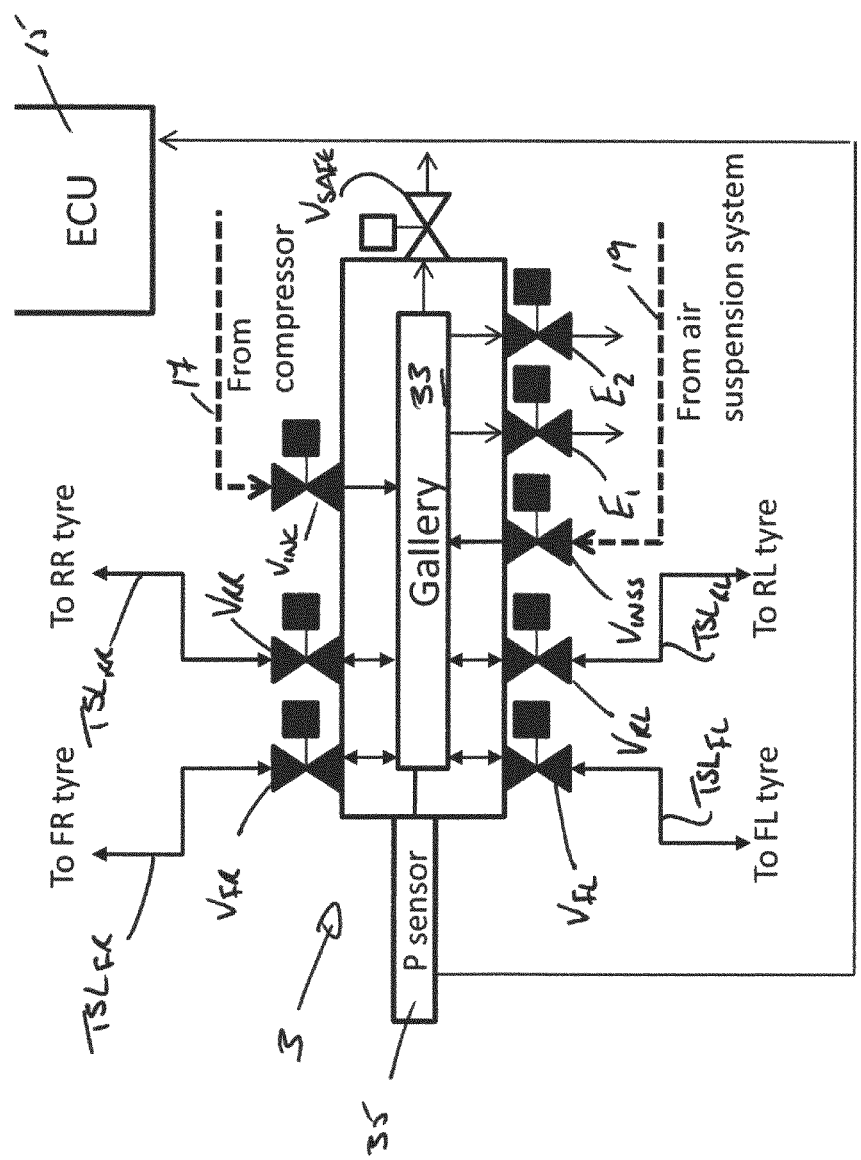
FIG. 1B is a schematic representation of a valve arrangement of the CTIS shown in FIG. 1A.
Figure 1C:
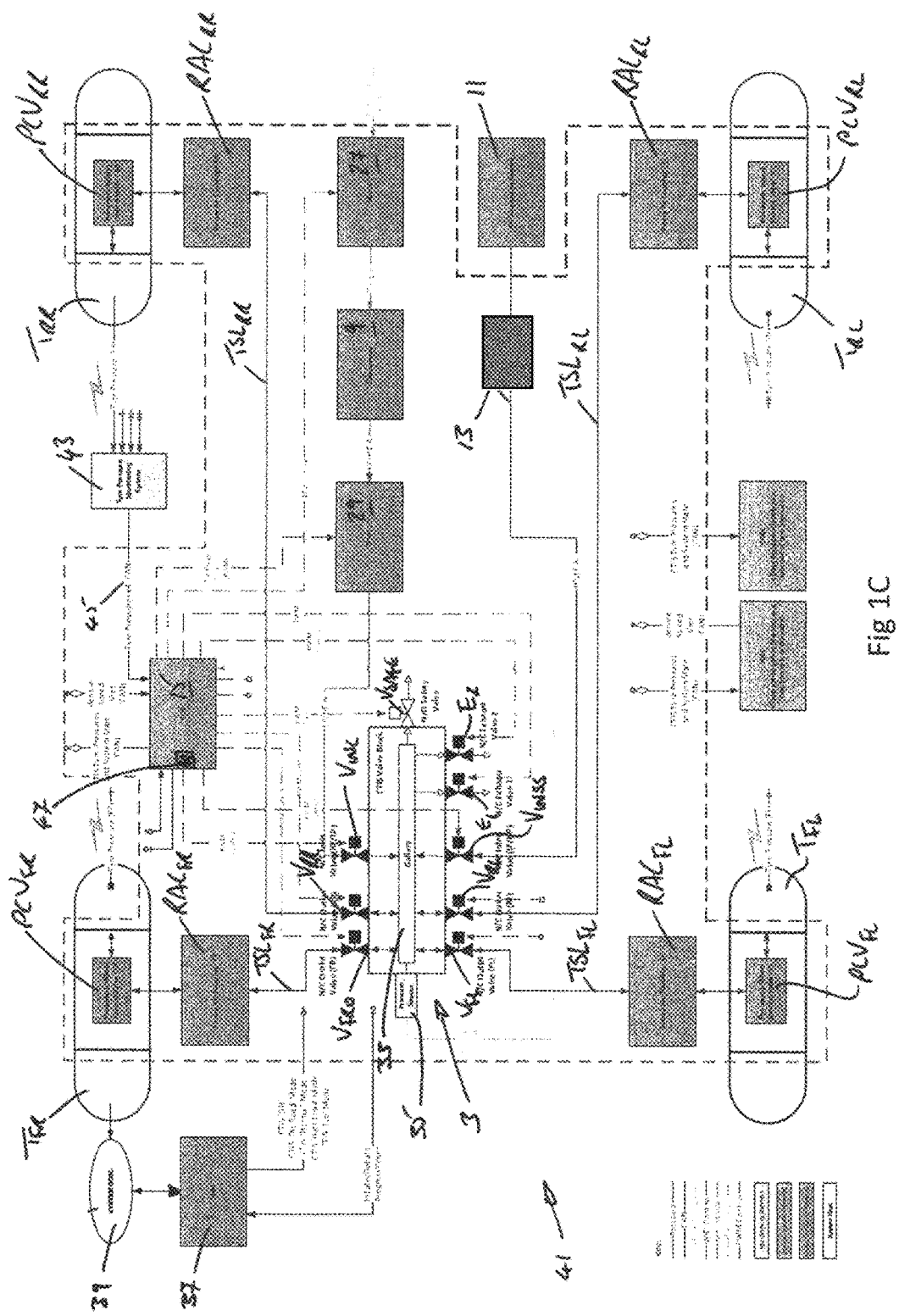

FIG. 1C illustrates the relationship between the main mechanical components of the CTIS 1 described herein (which incorporates the valve block 3 illustrated in FIG. 1B) and a vehicle control system 41. The vehicle control system 41 comprises the ECU 15. The ECU 15 is programmed to implement the control strategies and procedures described herein. In this embodiment, the ECU 15 receives from a tire pressure monitoring system (TPMS) 43, via a vehicle controller area network (CAN) 45, real-time information relating to the current tire pressures for the four tires T of the vehicle VH. The pressure sensor communicates directly with the ECU 15 via electric signals representative of the pressure measured by the pressure sensor 35 in the gallery 33 of the valve block 3. As described earlier, the pneumatic control valves PCV and the various valves V, I, E of the valve block 3 can be configured such that the pressure sensor 35 measures a pressure which is representative of the pressure inside each of the tires T. The TPMS 43 also monitors the temperature inside the tires T so that the tire pressures can be referred to a nominal temperature of 25 degrees C. using appropriate algorithms, for example a thermocouple or other thermal sensor may be located in or through the hub of each wheel.

The ECU 15 implements tire inflation and/or deflation strategies as described herein on the basis of the relationship between the target tire pressures and the current tire pressures as measured by the TPMS 43 and/or pressure sensor 35. To do this, the ECU 15 is required to control the various mechanical components of the CTIS 1. As seen in FIG. 1C, the ECU 15 is configured to control the outlet valves $V_O$ via a pulse width modulation (PWM) control network 47. Via the same PWM control network 47, the ECU 15 also controls the purging function of the dryer unit 29, the electric motor 27 which drives the compressor 9, the first and second inlet valves $V_{INC}$, $V_{INSS}$, the exhaust valves $E_1$, $E_2$ and the safety valve $V_{SAFE}$. As described herein, the target tire pressures can be manually selected by the driver of the vehicle via the human-to-machine interface (HMI) 37 or they can be automatically selected by the vehicle control system 41 on the basis of other information including vehicle driving modes. The HMI 37 communicates with the ECU 15 via the vehicle CAN 45. As an alternative to PWM control full cycle on/off solenoid valves could be used.

Figure 2:
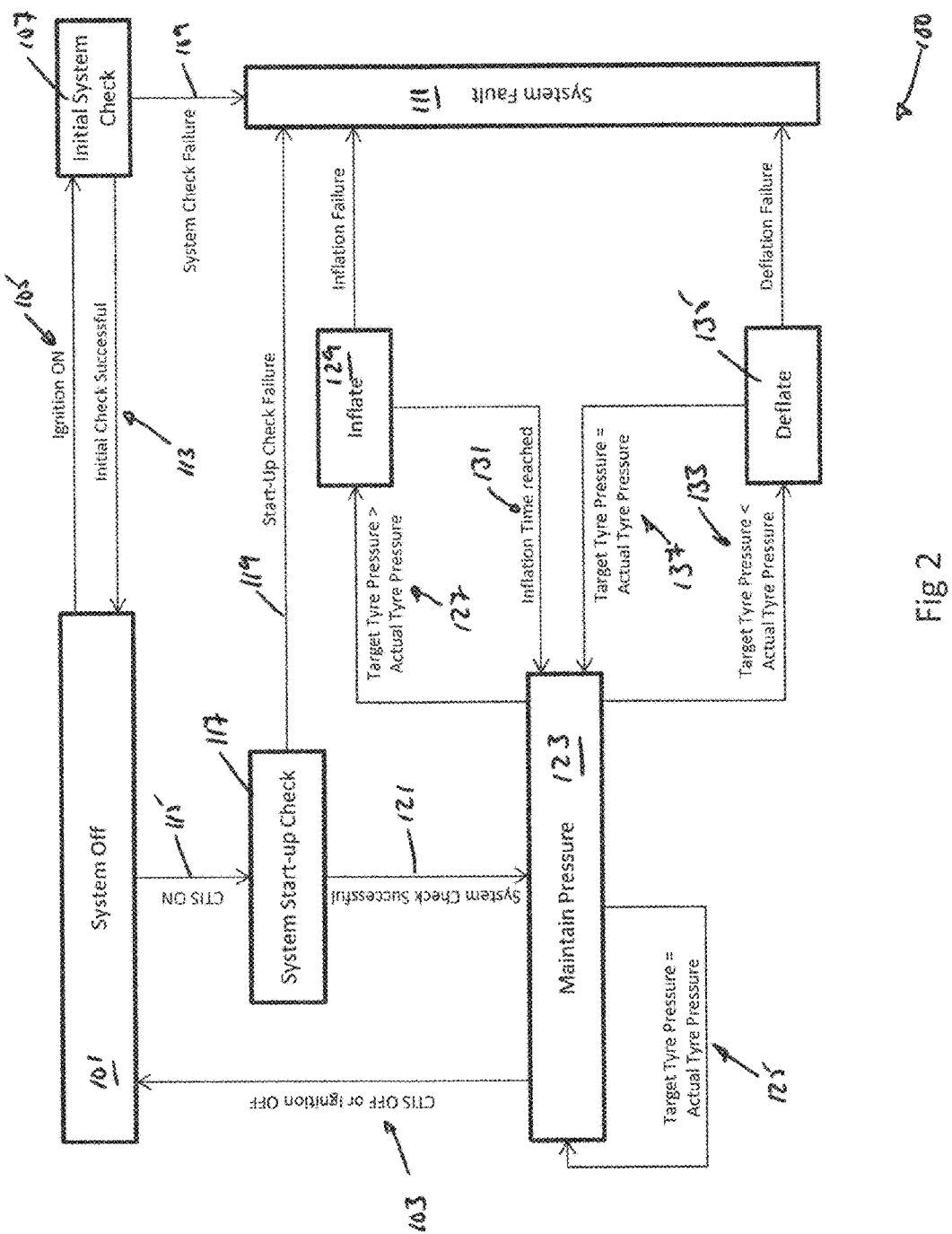
FIG. 2 is a high level block diagram illustrating the operation of the CTIS described herein.

A first block diagram 100 illustrating the operating modes of the CTIS 1 is show in FIG. 2. The CTIS 1 is initially switched off (STEP 101). In the present embodiment, the CTIS 1 can be switched off by a vehicle user command and/or by switching off the engine of the vehicle VH (CONDITION 103). When the engine is started (CONDITION 105) the CTIS 1 carries out an initial system check (STEP 107). If the initial system check detects a preliminary fault (CONDITION 109), e.g. compressor malfunction, the CTIS 1 enters a System Fault Mode (STEP 111) and the vehicle user is informed accordingly. If the initial check is successful (CONDITION 113) the CTIS 1 is ready to be switched on. When the CTIS 1 is then switched on by a user command (CONDITION 115), the CTIS 1 performs a system start-up check (STEP 117) to check that the components of the CTIS 1 are correctly working together and therefore capable of delivering compressed air to the tires T. If a fault is detected (CONDITION 119) the CTIS 1 enters the System Fault Mode (STEP 111) and the vehicle user is informed accordingly. If the check is successful (CONDITION 121) the CTIS 1 enters a Maintain Pressure Mode (STEP 123).

In the Maintain Pressure Mode (STEP 123), the CTIS 1 operates to ensure that a target tire pressure substantially equals a current tire pressure (CONDITION 125) for each of the tires T or for any selected tire combination (e.g. for the rear axle tires). If for any of the tires T the target tire pressure is greater than the current tire pressure (CONDITION 127), the CTIS 1 switches to an Inflate Mode (STEP 129). On the basis of the pressure difference between the target and current tire pressures, the ECU 15 retrieves an inflation time from a look-up table stored in a memory in the ECU 15.

When the inflation time has elapsed (CONDITION 131) for each tire T or for each combination of tires being simultaneously inflated, the CTIS 1 returns to the Maintain Pressure Mode (STEP 123).

If the current tire pressure is greater than the target tire pressure (CONDITION 133), the CTIS 1 enters a Deflate Mode (STEP 135). In the deflate mode, compressed air is vented from one or more tires T simultaneously and routed via one or more of the tire supply lines TSL to the valve block 3 and, from there, to atmosphere through the exhaust valves $E_1$, $E_2$, the exhaust outlet 23 and exhaust port 25. On the basis of the pressure difference between the target and current tire pressures, the ECU 15 retrieves the deflation time from the look-up table stored in a memory in the ECU 15. When the current/actual tire pressure reaches or substantially matches the target tire pressure (CONDITION 137) the CTIS 1 returns to the Maintain Pressure Mode (STEP 123).

If a fault develops during the Inflate Mode (STEP 129), or during the Deflate Mode (STEP 135), the CTIS 1 enters the System Fault Mode (STEP 111).

The target tire pressures can vary between different tires T and for all the tires T dependent on the vehicle driving mode. This will now be described with reference to a second block diagram 200 shown FIG. 3. The second block diagram 200 illustrates the four main vehicle driving modes, namely: an Economy Mode (Step 201); an On Road Mode (STEP 203); an Off Road Mode (STEP 205) and a Recovery Mode (STEP 207) (listed in decreasing order of target tire pressures). The Economy Mode (STEP 201) requires a target tire pressure of 2.8 bar for the front tires $T_{FL}$, $T_{FR}$ and 3.0 bar for the rear tires $T_{RR}$, $T_{RL}$. The On Road Mode (STEP 203) requires a target tire pressure of 2.3 bar for the front tires $T_{FL}$, $T_{FR}$ and 2.5 bar for the rear tires $T_{RR}$, $T_{RL}$. The Off Road Mode (STEP 205) requires a target tire pressure of 1.5 bar both for the front and rear tires $T_{FL}$, $T_{FR}$, $T_{RR}$, $T_{RL}$. The Recovery Mode (STEP 207) requires a target tire pressure of 1.2 bar both for the front and rear tires $T_{FL}$, $T_{FR}$, $T_{RR}$, $T_{RL}$. It will be apparent to the skilled person that these tire pressures are exemplary only and that actual tire pressures for different conditions will be dependent upon the specific tires and/or other factors.

When the vehicle switches from the Off Road Mode (STEP 205) to the On Road Mode (STEP 203), it is appropriate to inflate the tires to achieve the target tire pressure for the On Road Mode. The transition from the Off Road Mode (STEP 205) to the On Road Mode (203) can, for example, be performed automatically when the ECU 15 determines that the vehicle speed is greater than a reference threshold speed; or in dependence on a driver request. The ECU 15 enters an interim tire inflation mode (STEP 209). The ECU 15 is configured to inflate the tires T in two, distinct stages. The tire inflation procedure is performed 'per axle'. In a first phase (STEP 211), the ECU 15 inflates both the front and rear tires $T_{FL}$, $T_{FR}$, $T_{RR}$, $T_{RL}$ from the current tire pressures to an intermediate target tire pressure of, for example 2.0 bar. In a second phase (STEP 213), the ECU 15 inflates both the front and rear tires $T_{FL}$, $T_{FR}$, $T_{RR}$, $T_{RL}$ from the intermediate target tire pressure to the target tire pressures of 2.3 bar for the front tires $T_{FL}$, $T_{FR}$ and 2.5 bar for the rear tires $T_{RR}$, $T_{RL}$, as specified in the On Road Mode (STEP 203). In the described embodiment, the intermediate target tire pressure has been set to 2.0 bar to satisfy a local legal requirement. However, other selection criteria for selecting the intermediate target tire pressure could be used, in any case the intermediate pressure will be a pressure at which it is appropriate for the vehicle to be driven on a road. It will be appreciated that the tires T could be inflated in more than two stages.

In the present embodiment, the first phase (STEP 211) performed by the CTIS 1 requires less than one minute to inflate the tires T from their current tire pressure in the Off Road Mode (STEP 205) to the intermediate target tire pressure of 2.0 bar and the second phase (STEP 213) takes longer than one minute to successively inflate the tires T from the intermediate target tire pressure of 2.0 bar to the target tire pressures specified in the On Road Mode 51. The first phase (STEP 211) can be performed when the vehicle/vehicle VH is still off road, or when the vehicle VH is about to enter the road, followed by the second phase (STEP 213) which is performed subsequently, for example when the vehicle is on the road.

A first recovery Mode (STEP 207) is activated to recover the vehicle VH, for example when a vehicle belly-out event occurs. A vehicle belly-out event refers to a situation in which the vehicle body is partially or completely supported by the ground under the vehicle instead of being supported by the tires T. The Recovery Mode (STEP 207) can be activated automatically by the ECU 15; or by the driver of the vehicle. When the Recovery Mode (STEP 207) is activated, the vehicle verifies whether an adjustable ride height of the vehicle is in the highest position setting and if not the ECU controls the suspension to raise the vehicle and the CTIS 1 operates to reduce the pressure of the front tires $T_{FL}$, $T_{FR}$ and the rear tires $T_{RR}$, $T_{RL}$. to, for example, 1.2 bar. The Recovery Mode (STEP 207) is only activated when the vehicle VH is in the Off Road Mode 205. By decreasing the tire pressure a larger surface area of the tire will come into contact with the ground that will increase traction between the wheel and the surface, thereby assisting in reducing wheel slip and moving the vehicle, and increasing the ride height will lift the vehicle body slightly to raise it of the ground.

A second recovery mode is activated to recover the vehicle VH, for example when a vehicle becomes bogged down in sand or mud, i.e. the tires are spinning and have dug into the surface, but prior to the vehicle bellying out. The second recovery mode can be activated automatically by the ECU 15; or by the driver of the vehicle. When the second recovery mode is activated, the CTIS 1 operates to reduce the pressure of the front tires $T_{FL}$, $T_{FR}$ and the rear tires $T_{RR}$, $T_{RL}$. to, for example, 1.2 bar. The second recovery mode is only activated when the vehicle VH is in the Off Road Mode 205. By decreasing the tire pressure a larger surface area of the tire will come into contact with the ground that will increase traction between the wheel and the surface, thereby assisting in reducing wheel slip and moving the vehicle.

The Economy Mode (STEP 201) can be selectively activated by the user, or automatically by the ECU 15, for example based on vehicle speed. When the Economy Mode (STEP 201) is activated, the CTIS 1 operates to increase the pressure of the front tires $T_{FL}$, $T_{FR}$ to, for example, 2.8 bar; and to the rear tires $T_{RR}$, $T_{RL}$ to, for example, 3.0 bar. The increase in tire pressure can be performed in a single phase or multiple phases, for example to maintain the pressure differential between the front and rear tire pressures within a predefined margin. The Economy Mode (STEP 201) can be activated only when the vehicle is in the On Road Mode (STEP 203).

In the described embodiment, the Off Road Mode (STEP 205) needs to be manually requested by the driver. When the driver requests the Off Road Mode (STEP 205), the ECU 15 is programmed to deflate the tires T to the target tire pressure defined in the Off Road Mode (STEP 205). In the described embodiment, the tire deflation from the On Road Mode (STEP 203) to the Off Road Mode (STEP 205) lasts approximately 2.5 minutes (i.e. it is comparatively slower than the tire inflation procedure). The tire deflation from the On Road Mode to the Off Road mode can be performed on all four tires T at the same time.

Figure 3:
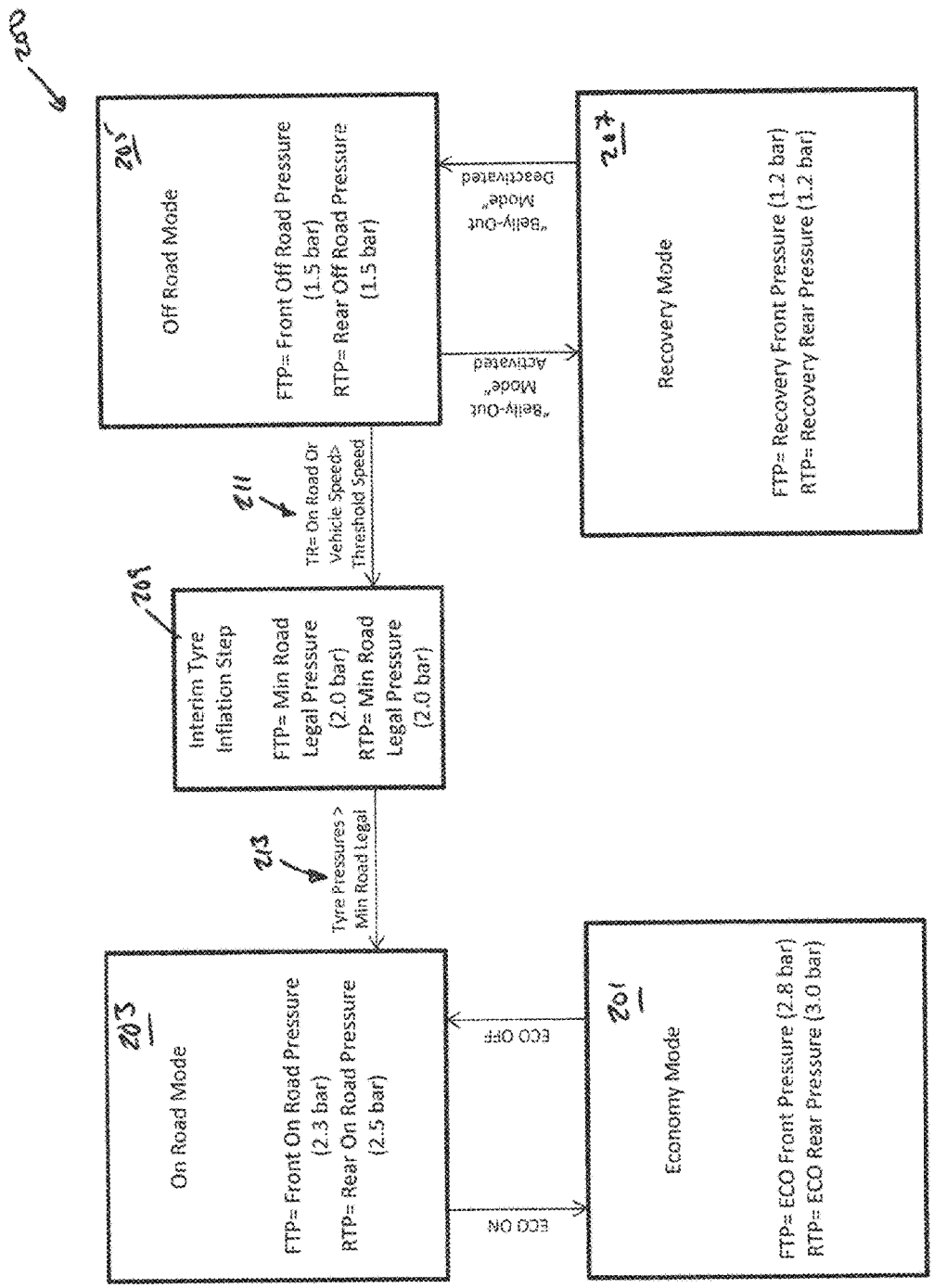
FIG. 3 is a block diagram illustrating a target tire pressure setting strategy implemented by the CTIS described herein.

The target tire pressures are set depending on the vehicle driving mode, as illustrated in FIG. 3. The actual or current tire pressure can be measured by the pressure sensor 35 coupled to the gallery 33 disposed in the valve block 3. Alternatively and/or additionally, the actual or current tire pressure is measured by a tire pressure monitoring system (TPMS) 43 provided on the vehicle VH (as shown in FIG. 1C). The TPMS 43 is responsible for providing the vehicle control system 9 with continuous information on the current tire pressures. The pressure sensor 35 is used to check the tire pressures after tire inflation and/or deflation. The TPMS 43 communicates wirelessly with a sensor provided in each tire T.

Figure 4:
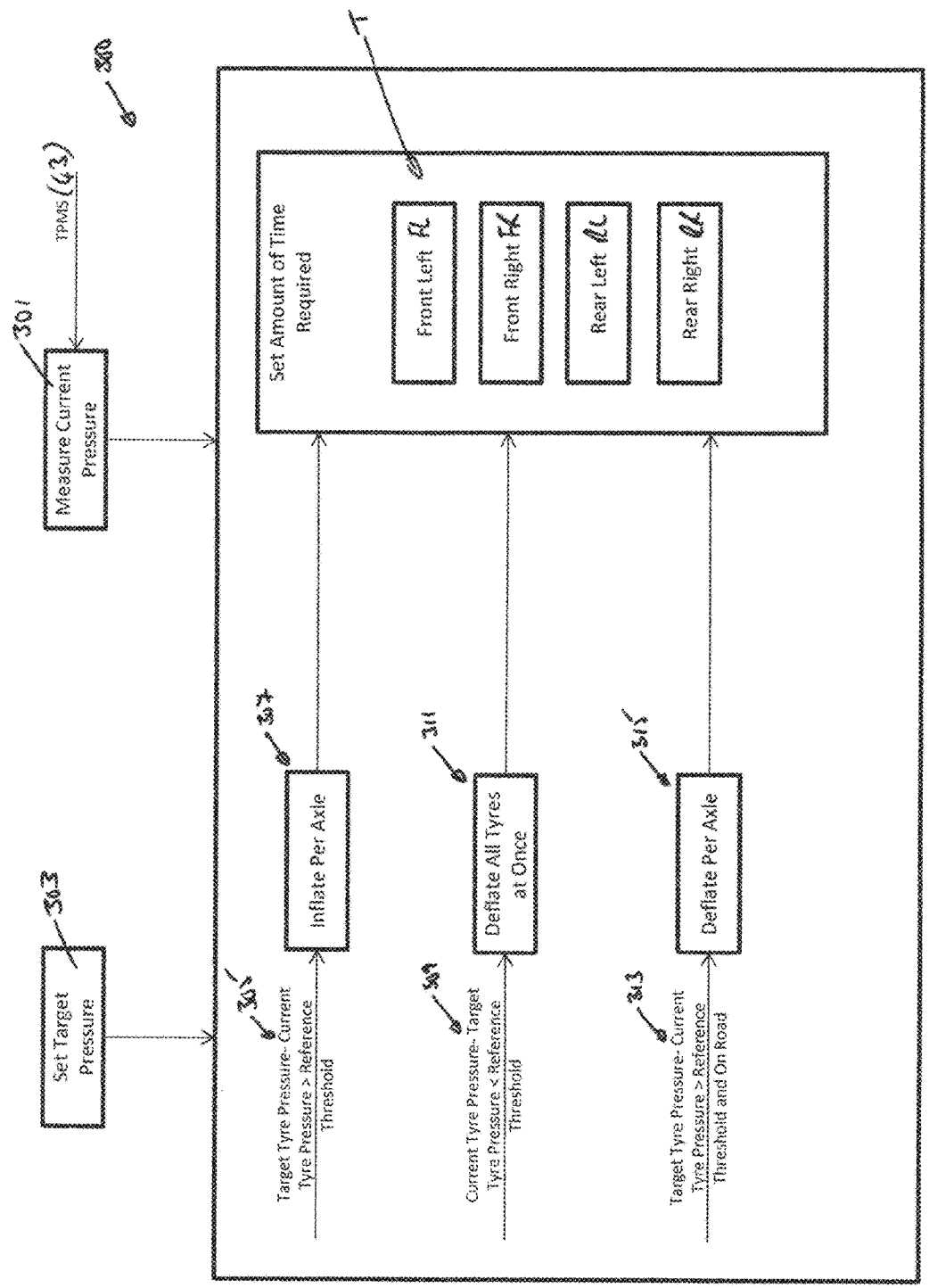
FIG. 4 is a block diagram illustrating a target tire pressure maintaining strategy implemented by the CTIS described herein.

Depending on the relationship between the target and current tire pressures, the ECU 15 may be configured to implement inflation and deflation strategies to try to maintain the current tire pressure as close as possible to, or equal to, the target tire pressures. A third block diagram 300 in FIG. 4 illustrates in more detail the strategy for maintaining the target tire pressures. Alternatively, or in addition, the present control strategy may be used for increasing and decreasing pressure in response to driver commands for different operating modes without the need to continuously attempt to maintain the pressure.

The TPMS 43 operates to measure the pressure of each tire T (STEP 301). A comparison is made between the measured (actual) tire pressure and a target tire pressure (STEP 303). If the target tire pressures for one or more of the tires T exceed the current tire pressure and the difference between the target tire pressures and the current tire pressures is greater than a predetermined reference pressure difference threshold (CONDITION 305), the ECU 15 is programmed to implement an Inflate Per Axle strategy (STEP 307). On the basis of the pressure difference between the target and current tire pressures, the ECU 15 first retrieves from memory the inflation time required to inflate each of the tires $T_{FL}$, $T_{FR}$, $T_{RR}$, $T_{RL}$ as shown in FIG. 4. Then, the ECU 15 controls the valve block 3 to inflate the tires of the rear axle $T_{RR}$, $T_{RL}$. Once the rear tires $T_{RR}$, $T_{RL}$ have been inflated, the ECU 15 controls the valve block 3 to inflate the tires of the front axle $T_{FL}$, $T_{FR}$. If there is a pressure difference discrepancy between right $T_{FR}$, $T_{RR}$ and left tires $T_{FL}$, $T_{RL}$ the corresponding right $V_{FR}$, $V_{RR}$ and left $V_{FL}$, $V_{RL}$ outlet valves can be opened for different time periods to compensate for such a discrepancy.

By using this staggered tire inflation strategy, the dynamic stability or handling balance of the vehicle 2 can be preserved during the tire inflation procedure. By inflating the tires of the rear axle $T_{RR}$, $T_{RL}$ followed by the tires of the front axle $T_{FL}$, $T_{FR}$, the handling characteristics of the vehicle VH can be biased towards understeer (rather than oversteer). In a driving experience ideally the user does not experience a change in driving dynamics, i.e. the manner in which the vehicle responds to the same input commands (e.g. steering wheel angle and throttle position). However driving dynamic is related to tire pressures and changing these dynamically while the vehicle is moving may affect driving dynamics. In order to minimize any perceived change to the driver the change is biased towards understeer during the change as an experience of understeer is less likely to cause the driver to experience a feeling of loss of composure of the vehicle than a bias towards overseer.

If the current tire pressure exceeds the target tire pressure and the difference between the current tire pressure and the target tire pressure is less than a predetermined reference pressure difference threshold (CONDITION 309), the CTIS 1 enters into a Deflate All Tires at Once mode (STEP 311). A deflate all tires at once strategy is described below with reference to FIG. 5.

If the current tire pressure exceeds the target tire pressure and the difference between the current tire pressure and the target tire pressure is greater than a predetermined reference pressure difference threshold and the vehicle operating mode is set on On Road Mode 51 (CONDITION 313), the ECU 15 is programmed to enter the CTIS 1 into a Deflate Per Axle strategy (STEP 315). A reverse staggered deflation logic is then applied by the CTIS 1 compared to the staggered Inflation Per Axle (STEP 307) described above. The front axle tires $T_{FL}$, $T_{FR}$ are first deflated to the required target pressure and the rear axle tires $T_{RR}$, $T_{RL}$ are deflated subsequently until the required target pressure is reached. This is done in order to maintain dynamic vehicle stability as explained above to bias any change in vehicle handling towards understeer rather than oversteer.

Figure 5:
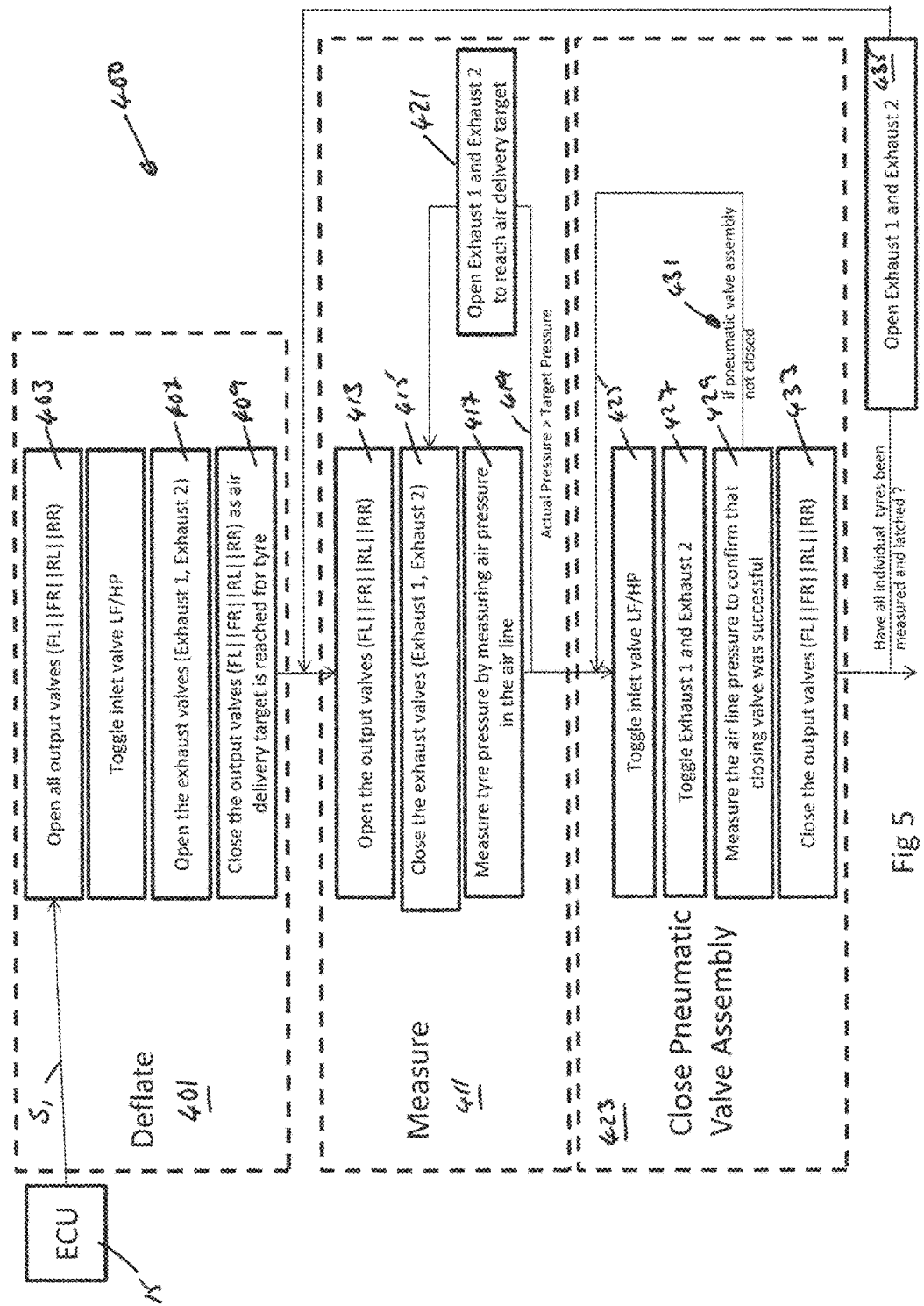
FIG. 5 is a block diagram illustrating in detail a tire deflation strategy implemented by the CTIS described herein.

A fourth block diagram 400 shown in FIG. 5 illustrates in more detail the Deflate All Tires at Once strategy (STEP 311) illustrated in FIG. 4. When the CTIS 1 enters the Deflate All Tires at Once strategy (STEP 311), the ECU 15 outputs a first signal $S_1$ to start a Deflate strategy (MODE 401). The outlet valves $V_O$ are opened (STEP 403) and the second inlet valve $V_{INSS}$ is toggled (i.e. opened and closed) so that the second compressed air source 7 generates a pneumatic control signal to open the pneumatic control valves PCV. The exhaust valves $E_1$, $E_2$ are then opened (STEP 407) and tire deflation commences. After a predetermined time period (retrieved by the ECU 15 from the look-up table stored in memory), the outlet valves $V_O$ are closed (STEP 409). The outlet valves $V_O$ may be closed on an individually timed basis to achieve the desired opening time of each outlet valve $V_O$. The ECU 15 produces a signal which causes the CTIS 1 to enter a Measure procedure (STEP 411).

In the Measure procedure (MODE 411), the exhaust valves $E_1$, $E_2$ are closed (STEP 415) and the outlet valves $V_O$ are opened individually, i.e. one at a time (STEP 413). The first one of the outlet valves $V_O$ may be opened substantially at the same time as the exhaust valves are closed, or alternatively the exhaust valves may be closed prior to opening any of the outlet valves. The pressure sensor 35 measures the pressure in the gallery 33, which is representative of the tire pressure of the tire T being measured (STEP 417). If, for any of the tires T, the measured tire pressure is greater than the target pressure (CONDITION 419), the exhaust valves $E_1$, $E_2$ are opened (STEP 421). Since the pneumatic control valve PCV corresponding to the tire being measured is still in the open position, compressed air is vented from the CTIS 1 and the relevant tire T is deflated further until measured tire pressure matches the target pressure. The procedure is repeated for the other three tires T, until the tire pressure of each of the four tires T matches the respective target pressure. Optionally tires on one axel may be measured/further deflated before moving on to the other axle. Before a tire pressure measurement for another tire T is taken, however, the outlet valve $V_O$ relating to the tire being measured is closed. The target tire pressure for the front tires $T_{FL}$, $T_{FR}$ and the rear tires $T_{RR}$, $T_{RL}$ tires can be the same (as in the case of the Off Road Mode 205) or can be different (as in the case of the Economy Mode 203). When the target tire pressure has been reached for all of the tires T, a strategy is implemented to close the pneumatic control valves PCV (MODE 423) is initiated by the ECU 15.

To close the pneumatic control valves PCV, a pneumatic control signal is generated by the second compressed air source 7 to cause the pneumatic control valves PCV to close for each tire T. This is achieved by toggling the LF/HP inlet valve $V_{INSS}$ (STEP 425). The exhaust valves $E_1$, $E_2$ are then also toggled, i.e. opened and then subsequently closed, to vent the air still present in the relevant tire supply line TSL to restore atmospheric pressure in this tire supply line TSL (STEP 427). The pressure sensor 35 can then measure a pressure in the gallery 33 representative of the pressure in this tire supply line TSL to check that the pneumatic control valve PCV associated with each tire has been successfully closed (STEP 429). If the latching is successful, the pressure sensor 35 measures a pressure equal to, or approximately equal to, atmospheric pressure. If latching is not successful (CONDITION 431), the latching procedure is repeated. If the latching has been successful, the relevant outlet valve $V_O$ is closed to isolate the respective tire supply line TSL. The procedure is later repeated for each of the remaining outlet valves $V_O$ of the valve block 3 (STEP 433), after the tire pressure of each of the tires T has been measured according to the Measure procedure (MODE 411).

It will be appreciated that the second inlet valve $V_{INSS}$ can be controlled to generate a pneumatic control signal for actuating a single pneumatic control valve PCV or for actuating a plurality of said pneumatic control valves PCV simultaneously. The outlet valve(s) $V_O$ can be opened or closed to communicate the pneumatic control signal along the appropriate tire supply lines TSL to control said one or more pneumatic control valves PCV. By controlling several pneumatic control valves PCV at the same time (for example to open or close them in unison), a time saving may be achieved.

When all the tires have reached the target tire pressure and all the pneumatic control valves PCV have been latched, the exhaust valves $E_1$, $E_2$ are opened (STEP 435).

Figure 6:
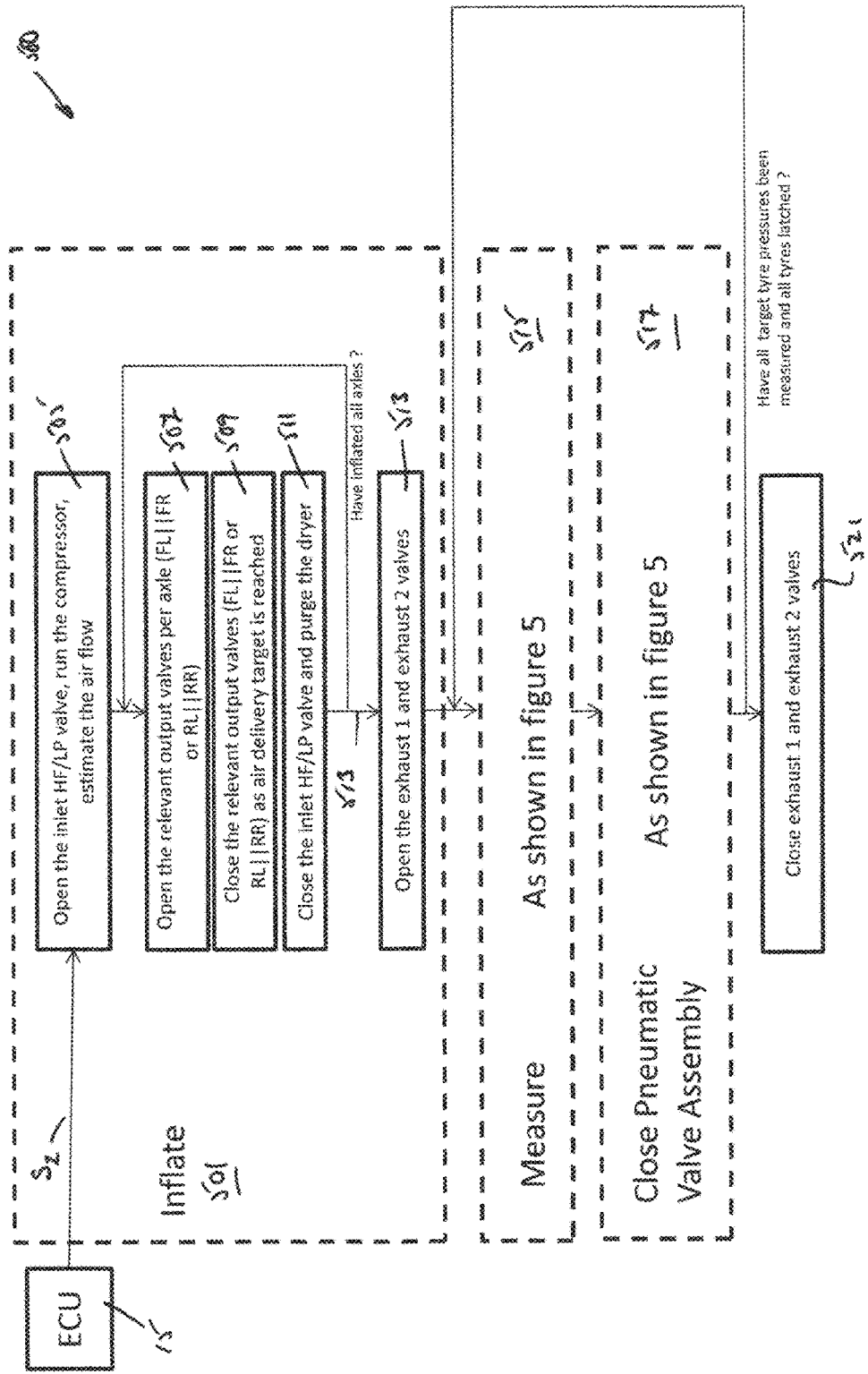
FIG. 6 is a block diagram illustrating in detail a tire inflation strategy implemented by the CTIS described herein.

A fifth block diagram 500 is shown in FIG. 6 to illustrate the Inflate Per Axle strategy (STEP 307) illustrated in FIG. 4. The ECU 15 generates a second signal $S_2$ to initiate the Inflate mode (STEP 501) to inflate the tires T on each axle in sequence. As outlined herein, the tires T on the rear axle are inflated first, and then the tires T on the front axle are inflated. The first inlet valve $V_{INC}$ is opened and the compressor 9 is activated (STEP 505). The airflow from the compressor 9 is estimated based on the current/voltage drawn by the compressor 9 (which indicates the work done compressing the air) optionally together with pressure/temperature information (which approximates the density of air drawn into the compressor 9). A performance table for the compressor 9 is typically available from the supplier to enable the airflow to be estimated. As the tire pressure rises, the compressor 9 will be working against a higher pressure so the flow rate of air delivered to the tire supply line will change dynamically.

The ECU 15 accesses the stored look-up table to determine the inflation time for each outlet valve (the front outlet valves $V_{FL}$, $V_{FR}$ or rear outlet valves $V_{RL}$, $V_{RR}$). The relevant outlet valves $V_O$ (the front outlet valves $V_{FL}$, $V_{FR}$; or the rear outlet valves $V_{RL}$, $V_{RR}$) are then opened (STEP 507). The second inlet valve $V_{INSS}$ is controlled to toggle the pneumatic control valves PCV for the tires T to an open position (if they are not already in an open state). It will be appreciated that the second inlet valve $V_{INSS}$ can be controlled to generate a pneumatic control signal for controlling more than one pneumatic control valve PCV simultaneously when the corresponding outlet valves $V_O$ are open. The outlet valves $V_O$ are closed when the compressed air has been delivered to achieve the target pressure (STEP 509). At this stage, the first inlet valve $V_{INC}$ is also closed, and the dryer unit 29 may optionally be purged from water removed from the delivered compressed air (STEP 511).

When all the tires T have been inflated, i.e. when the Inflate mode (STEP 501) has been repeated for the other axle (CONDITION 513), the exhaust valves $E_1$, $E_2$ are opened to purge excess compressed air from the valve block 3 (STEP 513) so that the Measure mode (STEP 515) can be performed. The pneumatic control valves PCV for all of the tires T are then closed (STEP 517). These procedures are unchanged from those described herein with reference to FIG. 5 for each of the tires T in anticlockwise sequence. When the target tire pressure for all the tires T has been reached and all the pneumatic control valves PCV have been closed (CONDITION 519), the exhaust valves $E_1$, $E_2$ are closed (STEP 521). If the target tire pressure has not been reached or any of the pneumatic control valves PCV remain open, the appropriate procedures (STEP 515 and STEP 517) are repeated.

Figure 7:
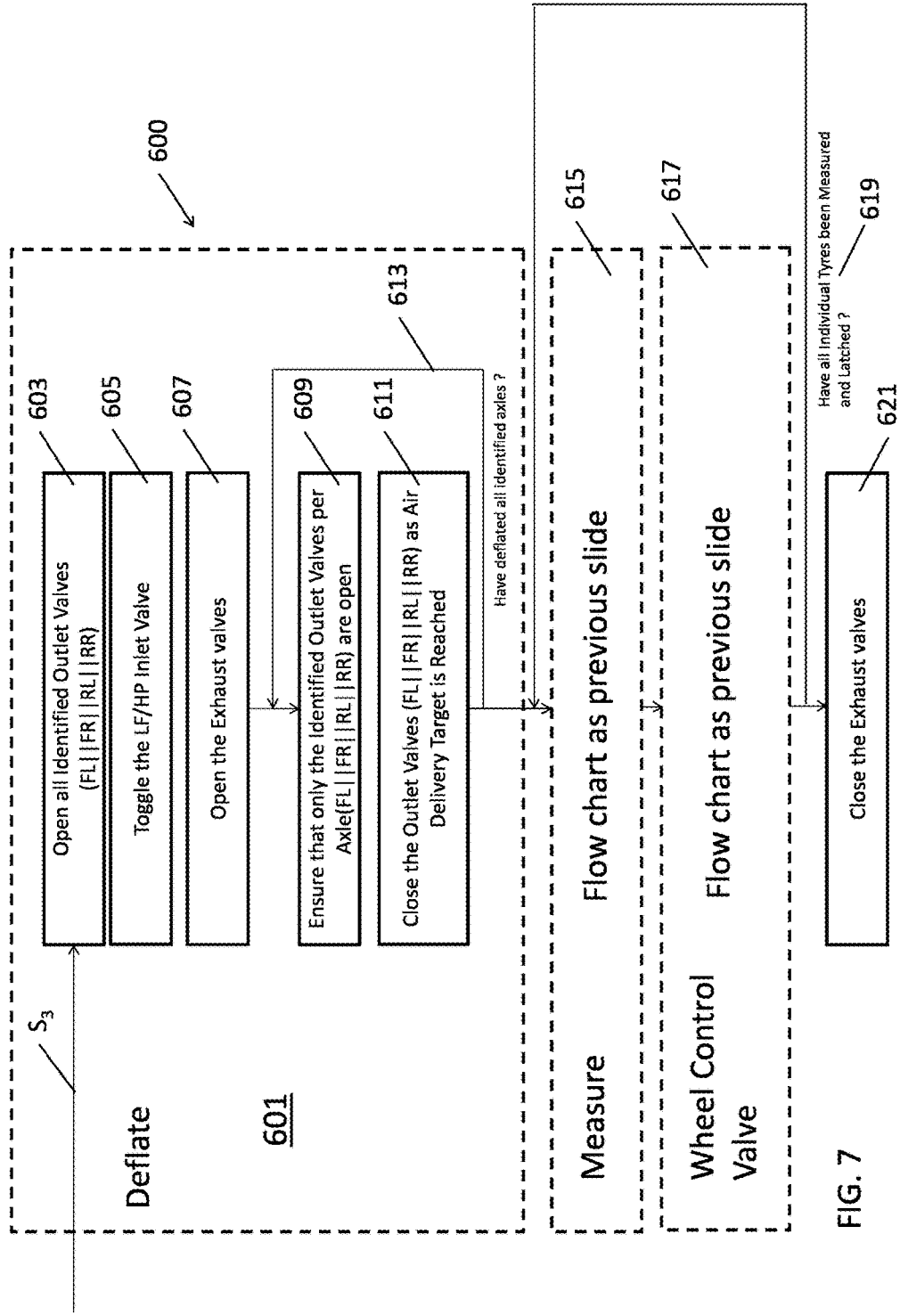
FIG. 7 is a block diagram illustrating in detail an alternative tire deflation strategy implemented by the CTIS described herein.

A sixth block diagram 600 is shown in FIG. 7 to illustrate in more detail the Deflate Per Axle strategy (STEP 315). When the entry conditions are satisfied, the ECU 15 causes the CTIS 1 to enter the Deflate Per Axle strategy (STEP 315). The ECU 15 produces a third signal $S_3$ to cause the CTIS 1 to start the Deflate procedure (STEP 601). All the outlet valves $V_O$ associated with one of the axles (the front outlet valves $V_{FL}$, $V_{FR}$ or rear outlet valves $V_{RL}$, $V_{RR}$) are initially opened (STEP 603). The second inlet valve $V_{INSS}$ is toggled (STEP 605) to open the pneumatic control valves PCV in the relevant axle. The exhaust valves $E_1$, $E_2$ are then opened (STEP 607) so that the deflation of the tires T connected to the relevant axle commences. A check (STEP 609) is then performed to ensure that only the appropriate outlet valves $V_O$ associated with each axle are open (the front outlet valves $V_{FL}$, $V_{FR}$ or the rear outlet valves $V_{RL}$, $V_{RR}$).

When the outlet valves (the front outlet valves $V_{FL}$, $V_{FR}$ or rear outlet valves $V_{RL}$, $V_{RR}$) have been opened for the desired time period to reach the target amount of compressed air removed from the tires T, the outlet valves $V_O$ are closed (STEP 611). The procedure is repeated if the tires connected to the other axle need also to be deflated (CONDITION 613).

When all the tires T have been deflated, the Measure procedure (STEP 615) and the procedure to close the pneumatic control valves PCV (STEP 617) are carried out. These procedures are the same as those described herein with reference to FIG. 5. When the target tire pressure for all the tires T has been reached and all the pneumatic control valves PCV have been closed (CONDITION 619), the exhaust valves $E_1$, $E_2$ are closed (STEP 621). It will be appreciated that the deflation procedure can be performed with a single toggle (open/closed) of the appropriate pneumatic control valve(s) PCV. The deflation of the tire(s) T is thereafter controlled by the outlet valves $V_O$ in the valve block 3. It is not necessary to toggle the pneumatic control valve(s) PCV between axle deflations. Rather, the pneumatic control valve(s) PCV remain open following deflation for measurement (STEP 614) before being closed together.

As illustrated by FIG. 7, the CTIS 1 can also deflate all four tires T of the vehicle VH by first deflating two tires T of one of the axles (in the described embodiment, the tires mounted to the front axle $T_{FL}$, $T_{FR}$ are deflated first, as described above), and then the other two tires T of the other one of the axles. This tire deflation strategy is also referred to as per axle deflation. Alternatively, the CTIS 1 can deflate the four tires T one tire T at a time, i.e. the tires T can be individually deflated, measured and closed via the procedure for closing the pneumatic control valves PCV.

As illustrated by FIG. 6, the CTIS 1 can inflate all four tires T of the vehicle VH by first inflating the two tires T of one of the axles (in the present embodiment, the tires mounted to the rear axle $T_{RL}$, $T_{RR}$ are inflated first), and then the other two tires T of the other one of the axles. Alternatively, the CTIS 1 can inflate all four tires T individually. The CTIS 1 is not designed to inflate all four tires T simultaneously due to the flow rate and maximum pressure limitations of the compressor 9. However, it will be understood that it is in principle possible to adapt the CTIS 1 to simultaneously inflate all the tires T, by using a compressor 9 with an adequate flow-rate and pressure rating.

The valve usage per unit time will now be considered. A complete inflation or deflation event (i.e. including tire inflation or tire deflation, tire pressure measurement and latching of the pneumatic control valve PCV), which may involve some or all of the tires T, is referred to herein as a complete tire inflation or deflation cycle. This is in contrast to tire inflation or deflation (operations) which, as described above, only relates to the presence of compressed air flow (into or out from the tires T). It will be appreciated that, in practice, the CTIS 1 may be required to change the tire pressure of only some of the tires T. A first table 710 shown in FIG. 8 summarizes valve usage for a complete tire deflation cycle involving simultaneous deflation of all four of the tires T.

The first table 710 refers to deflation of all the tires to 1.5 bar, as described in FIG. 3 in connection with the passage of the vehicle from the On Road mode 203 to the Off Road mode 205. A first column 711 of the first table 710 lists the inlet valves $V_{INC}$, $V_{INSS}$, the outlet valves $V_O$ and the exhaust valves V of the CTIS valve block 3. A second column 712 counts, for each of the valves listed in the first column 711, the respective valve cycles in the Deflate procedure 401 illustrated in FIG. 5. For each of the tires T, a third 713, fourth 714, fifth 715 and sixth 716 column of the first table 710 list the respective valve cycles during the Measure procedure 411 and Close Pneumatic control valve procedure 423 of FIG. 5. A seventh column 717 lists the total of the valve cycles for each of the valves listed in the first column 711. If after a measurement there is a need to deflate further a tire, the exhaust valves $E_1$, $E_2$ undergo the same number of cycles as described in the last two rows 718 of the first table 710 plus one cycle for each of the exhaust valves.

A second table 720 shown in FIG. 9 summarizes similar valve usage information for a deflation procedure wherein the tires T are deflated individually (this procedure is not illustrated in FIGS. 4 to 7, and is used in connection with the passage of the vehicle from the Economy Mode 201 to the On Road Mode 203 of FIG. 3). In this procedure, all of the outlet valves $V_O$ of the valve block 3 are first opened together as illustrated by step 403 of FIG. 5. This allows the CTIS 1 to be prepared for deflation. Then, each of the tires $T_{FL}$, $T_{FR}$, $T_{RR}$, $T_{RL}$ is individually deflated until the target tire pressures of the On Road Mode 203 illustrated in FIG. 3 are reached. For this reason, the valve cycle count for each of the corresponding outlet valves $V_{FL}$, $V_{FR}$, $V_{RR}$, $V_{RL}$ in a second column 721 of the second table 720 is different compared to the second column 712 of the first table 710, with the outlet valves $V_{FL}$, $V_{FR}$, $V_{RR}$, $V_{RL}$ now counting two valve cycles each instead of one. Likewise, if after a measurement there is a need to deflate further each tire $T_{FL}$, $T_{FR}$, $T_{RR}$, $T_{RL}$, the deflation procedure is individually repeated, and the exhaust valves $E_1$, $E_2$ undergo the same number of cycles as described in the last two rows 721 of the second table 720 plus one cycle for each of the exhaust valves $E_1$, $E_2$.

Figures 10, 11:
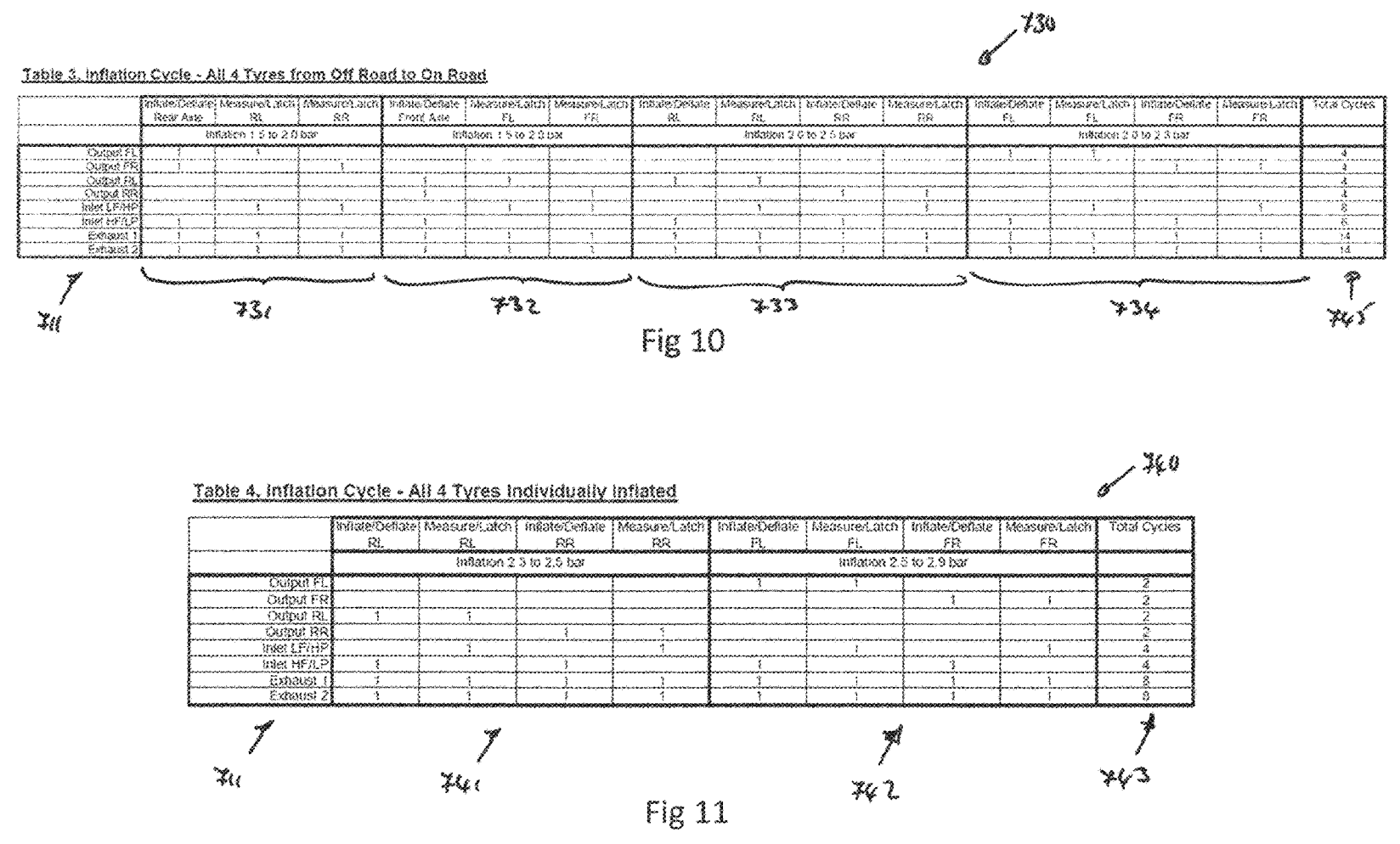

A third table 730 shown in FIG. 10 summarizes similar valve usage information for a tire inflation cycle where the tires T are inflated from the target pressures of the Off Road Mode 205 to the target pressures of the On Road Mode 203 of FIG. 3 via the Interim tire inflation step 209, also shown in FIG. 3. The third table 730 is divided in five main table sections 731, 732, 733, 734, 735. The first table section 731 relates to the inflation of the tires of the rear axle $T_{RR}$, $T_{RL}$ from 1.5 bar to 2.0 bar according to Inflate procedure 501, Measure procedure 515 and Close Pneumatic control valve procedure 517 of FIG. 6. The columns in this first table section 731 list the valve cycle counts for each valve $V_O$, $V_{INC}$, $V_{INSS}$, $E_1$, $E_2$ of the valve block 3 and for each procedure. The second table section 732 relates to the inflation of the tires of the front axle $T_{FL}$, $T_{FR}$ from 1.5 bar to 2.0 bar also according to Inflate procedure 501, Measure procedure 515 and Close Pneumatic control valve procedure 517 of FIG. 6. Likewise, the columns in the second table section 732 list the valve cycle counts for each valve $V_O$, $V_{INC}$, $V_{INSS}$, $E_1$, $E_2$ of the valve block 3 and for each procedure. The third table section 733 relates to the inflation of the tires of the rear axle $T_{RR}$, $T_{RL}$ from 2.0 bar to 2.5 bar. However, in this sequence the rear tires $T_{RR}$, $T_{RL}$ are inflated, measured and then the corresponding pneumatic control valves $PCV_{RR}$, $PCV_{RL}$ closed individually instead of being closed per axle as was the case for the previous two table sections 731, 732. The columns in the third table section 733 list the valve cycle counts for each valve $V_O$, $V_{INC}$, $V_{INSS}$, $E_1$, $E_2$ of the valve block 3 and for each individual procedure. The fourth table section 144 of the third table 140 relates to the inflation of the tires of the front axle $T_{FL}$, $T_{FR}$ from 2.0 bar to 2.3 bar. Likewise, in this sequence the front tires $T_{FL}$, $T_{FR}$ are inflated, measured and the corresponding pneumatic control valves $PCV_{FL}$, $PCV_{FR}$ closed individually. The columns in the fourth table section 734 of the third table 730 list the valve cycle counts for each valve $V_O$, $V_{INC}$, $V_{INSS}$, $E_1$, $E_2$ of the valve block 3 and for each individual procedure. The fifth table section 735 summarizes the total valve cycles for these valves $V_O$, $V_{INC}$, $V_{INSS}$, $E_1$, $E_2$.

A fourth table 740 is shown in FIG. 11 and summarizes similar valve usage information for a tire inflation cycle wherein the tires T are inflated from the target pressures of the On Road Mode 203 to the target pressures of the Economy Mode 201. The fourth table 740 is divided in three table sections 741, 742, 743. The first table section 741 of the fourth table 740 is equivalent to the third table section 733 of the third table 730, and the second table section 742 of the fourth table 740 is equivalent to the fourth table section 734 of the third table 730. The third table section 743 of the fourth table 740 represents the total valve cycles in the inflation procedure for the same valves $V_O$, $V_{INC}$, $V_{INSS}$, $E_1$, $E_2$ of the valve block 3.

A fifth table 750 is shown in FIG. 12 to summarize, again for each of the valves $V_O$, $V_{INC}$, $V_{INSS}$, $E_1$, $E_2$ of the valve block 3 (listed in the first columns of the first, second, third and fourth tables 710, 720, 730, 740 described above), the number of valve cycles estimated in a time period of one year assuming different vehicle operation conditions (off road and on road) and different usage types (sand, wet grass, mud and snow for the off road vehicle operation condition and economy (ECO), high speed, gross vehicle weight (GVW) and towing for the on road vehicle operating condition). Estimated valve cycles in one year are also provided in FIG. 12 for a tire pressure maintenance condition (in the row before the last in the fifth table 750 shown in FIG. 12). The tire pressure maintenance condition relates to the pressure maintaining strategy illustrated in FIG. 4. As can be seen from the fifth table 750, the valves $V_O$, $V_{INC}$, $V_{INSS}$, $E_1$, $E_2$ of the valve block 3 are estimated to collectively undergo 31,590 cycles in the unit time of one year.

FIGS. 13 to 16 show for parts of a per axle deflation cycle and a per axle inflation cycle, the pressure measured in the gallery 33 by the pressure sensor 35 alongside the status of the various valves V, I, E of the valve block 3 illustrated in FIG. 1B.

Figure 13:
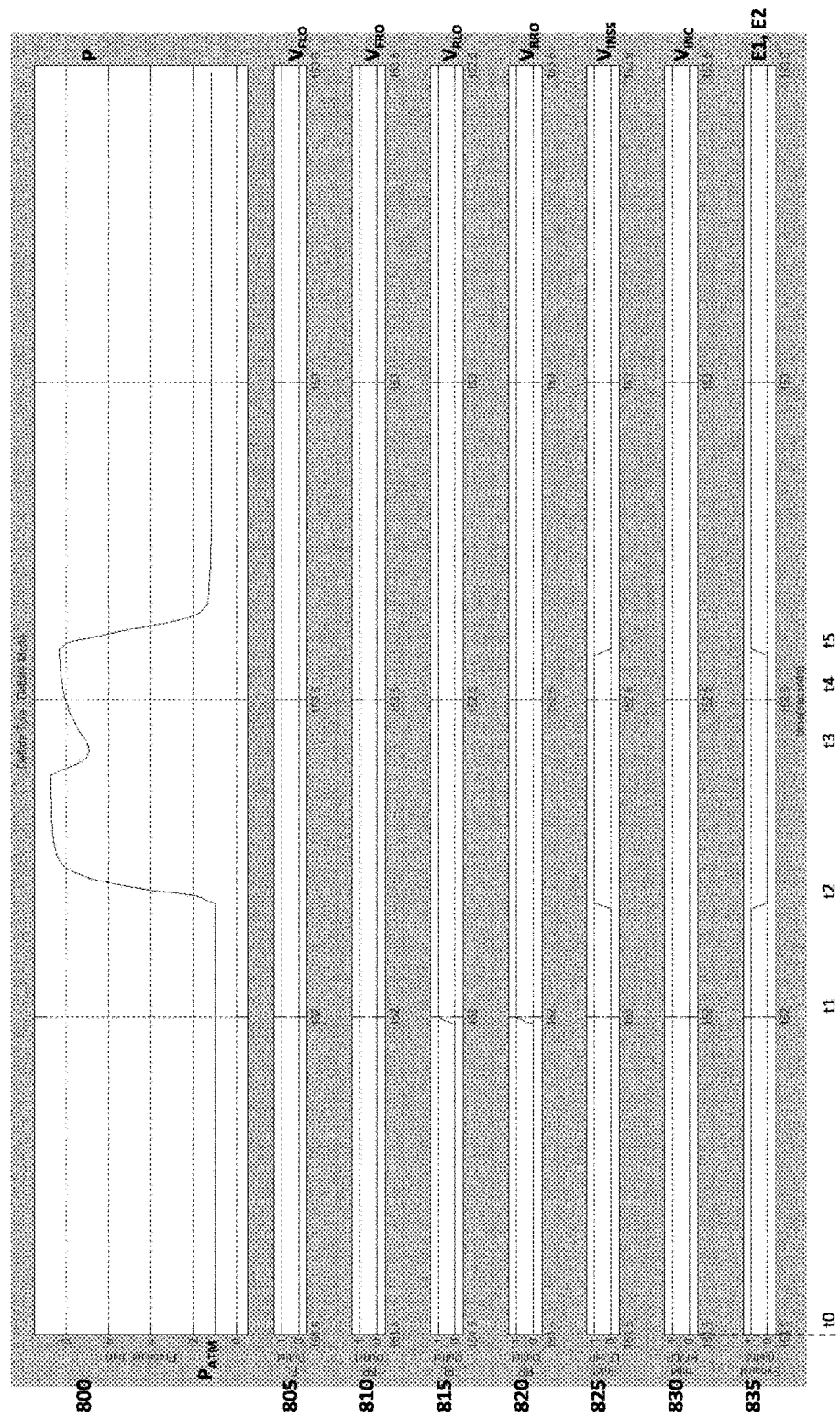
FIG. 13 is a series of graphs showing: a) the pressure measured by a tire pressure monitoring sensor; and b) the status (open=1; closed=0) of the valves of the CTIS described herein, through part of a tire deflation cycle concerning the rear axle.

A first graph 800 in FIG. 13 shows the pressure measured by the pressure sensor 35 during a first part of a tire deflation cycle identified over a time period from 151.5 sec (designated time t0) to 153.5 sec. At time t0, the pressure measured by the pressure sensor 35 is substantially equal to atmospheric pressure (Patm). This represents a stand-by condition for the CTIS 1. At this time, the pressure at the pressure sensor 35 is representative of the pressure in the relevant tire supply lines TSL. At time t0, the measured pressure is equal to Patm since the exhaust valves $E_1$, $E_2$ are open, as illustrated by an eighth graph 835 in FIG. 13. At time t1 (152 sec), the rear outlet valves $V_{RL}$, $V_{RRO}$ are opened in preparation for deflating the tires of the rear axle $T_{RL}$, $T_{RR}$ of the vehicle VH, as shown in a fourth and fifth graph 815, 820 in FIG. 13. The front outlet valves $V_{FLO}$, $V_{FRO}$ remain closed throughout the time period represented in FIG. 13, as illustrated by a second and third graph 805, 810 in FIG. 13. At time t2 (approximately 152.2 sec), the exhaust valves $E_1$, $E_2$ are closed thereby sealing the tire supply lines TSL from atmosphere, as shown by the eighth graph 835. At time t2, the inlet valve $V_{INSS}$ is instead opened to allow compressed air from the second compressed air source 7 into the tire supply lines TSL, as shown by a sixth graph 825 in FIG. 13. At time t2, therefore, the pressure sensor 35 detects a pressure increase in the gallery 33 of the valve block 3 as shown in the first graph 800. The incoming compressed air from the second compressed air source 7 toggles the pneumatic control valves located on the rear wheels $PCV_{RL}$, $PCV_{RR}$ to an open state. This is possible because the rear outlet valves $V_{RLO}$, $V_{RRO}$ are open at time t2. The instant at which the rear pneumatic control valves $PCV_{RL}$, $PCV_{RR}$ are opened is time t3 (approximately 152.4 sec) in FIG. 13. At time t3, the pressure sensor 35 detects a dip in the pressure measured in the tire supply lines TSL. For a short time period between time t3 and time t4 (approximately 152.6 sec), pressure within the tires, the gallery and the tire supply lines equalizes resulting in a pressure fluctuation being seen at the pressure sensor. At time t5, the exhaust valves $E_1$, $E_2$ are opened and the second inlet valve $V_{INSS}$ is closed. These events initiate tire deflation. From time t5 onwards, compressed air flows from inside the rear tire cavities through the rear tire supply lines $TSL_{RL}$, $TSL_{RR}$ out to atmosphere. Thereafter, the pressure sensor 35 senses a pressure just above atmospheric pressure Patm due to the incoming flow of compressed air from the rear tire cavities, as shown by the first graph 800 in FIG. 13. It will be appreciated that during the tire deflation procedure, as shown by a seventh graph 830 in FIG. 13, the first compressed air source 5 does not operate. Accordingly, the first inlet valve $V_{INC}$ remains closed for the time period illustrated in FIG. 13.

Figure 14:
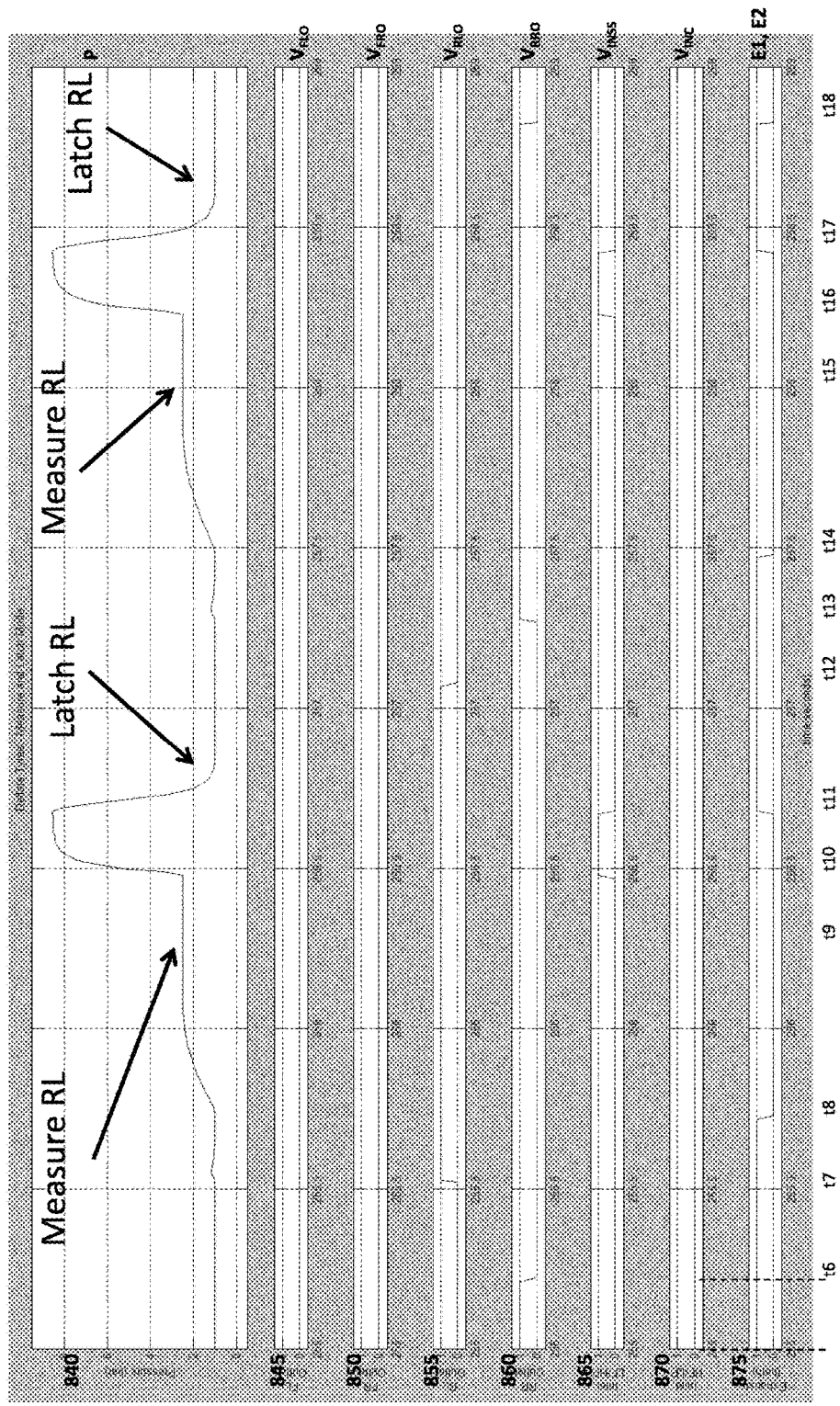
FIG. 14 is a series of graphs showing: a) the pressure measured by a tire pressure monitoring sensor; and b) the status (open=1; closed=0) of the valves of the CTIS described herein, through another part of the tire deflation cycle referred to in FIG. 13.

In the described tire deflation procedure, compressed air flows from the rear tire cavities out to atmosphere for a different deflation time for each of the rear tires $T_{RL}$, $T_{RR}$. This deflation occurs over a time period of approximately 100 seconds for the rear right tire $T_{RR}$. In particular, the deflation of the rear right tire $T_{RR}$ commences at time t5 (152.5 sec) when the exhaust valves $E_1$, $E_2$ open, as shown in FIG. 13. The deflation of the rear right tire $T_{RR}$ ends at time t6 (255.2 sec) when the rear right outlet valve $V_{RRO}$ is closed, as shown in FIG. 14. As explained above, the deflation period is retrieved by the ECU 15 on the basis of a look-up table stored in a memory. The look-up table correlates pressure decrease with deflation time for the tire deflation procedure, and pressure increase with inflation time for the tire inflation procedure. The rear left outlet valve $V_{RLO}$ is closed at an intermediate time which is not shown in FIGS. 13 and 14. FIG. 14 only relates to the rear axle tire measurement and closure procedures starting from time t8.

Referring now to FIG. 14, a first graph 840 of FIG. 14 shows the pressure measured by the pressure sensor 35 during a part of a tire deflation cycle identified between a time period extending from 255 sec to 259 sec. As shown by the first graph 840 in FIG. 14, the pressure measured by the pressure sensor 35 is substantially equal to the atmospheric pressure (Patm) since the rear right tire $T_{RR}$ is deflated until time t6 (approximately 255.3 sec) and the exhaust valves $E_1$, $E_2$ are open, as illustrated by an eighth graph 875 in FIG. 14. At time t6, the rear right outlet valve $V_{RRO}$ is closed and, therefore, both the rear tires $T_{RL}$, $T_{RR}$ are now ready to undergo the tire pressure measurement and pneumatic control valve closure procedures. For the rear left tire $T_{RL}$, this procedure begins at time t7 (just after 255.5 sec), as shown in FIG. 14, with the opening of the rear left outlet valve $T_{RL}$ as shown by a fourth graph 855 in FIG. 14. At time t8 (approximately 255.7 sec), the exhaust valves $E_1$, $E_2$ are closed so that the pressure sensor 35 can now detect a tire pressure representative of the tire pressure in the rear left tire $T_{RL}$. As soon as the exhaust valves $E_1$, $E_2$ are closed, the pressure sensed by the pressure sensor 35 starts to increase until it reaches the pressure representative of the tire pressure in the rear left tire $T_{RL}$. The ECU 15 causes the pressure sensor 35 to take a reading at time t9 (approximately 256.3 sec). Once the reading has been taken, the second inlet valve $V_{INSS}$ is opened at t10 (256.5 sec) and closed at t11 (256.7 sec). This operation, as explained above, toggles the rear left pneumatic control valve $PCV_{RL}$ to a closed state and causes the pressure sensor 35 to detect pressures of up to about 9 bar, as shown by the first graph 840 of FIG. 14. When the rear left pneumatic control valve $PCV_{RL}$ is latched and the exhaust valves $E_1$, $E_2$ are opened at time t11 (256.7 sec), the pressure sensed by the pressure sensor 35 is atmospheric pressure Patm again, which, as explained above, corresponds to a stand-by condition. The first compressed air source 5 is not involved in this procedure, as shown by a seventh graph 870 in FIG. 14 showing the first (i.e. HF/LP) inlet valve $V_{INC}$ permanently closed. The front outlet valves $V_{FLO}$, $V_{FRO}$ are also not involved in the procedure, as shown by a second and third graph 845, 850 in FIG. 14. The tire pressure measurement and pneumatic control valve closure procedures are then repeated for the rear right tire $T_{RR}$ by nearly simultaneously closing the rear left outlet valve $V_{RLO}$ (as shown by the fourth graph 855 of FIG. 14 at around time t12 (approximately 257.1 sec) and opening the rear right outlet valve $V_{RRO}$, as shown by a fifth graph 860 at t13 (257.3 sec). At time t14 (257.5 sec), the exhaust valves $E_1$, $E_2$ are closed and the pressure sensed by the pressure sensor 35 increases as compressed air from the rear right deflated tire cavity populates the corresponding tire supply line $TSL_{RR}$. The ECU 15 causes a reading to be taken from the pressure sensor 35 at time t15 (258 sec), as shown in the first graph 840 in FIG. 14, when the pressure measured by the pressure sensor 35 is representative of the tire pressure in the rear right tire cavity. Between time t16 and time t17 the second inlet valve $V_{INSS}$ (i.e. the LF/HP inlet valve) is opened and closed, which causes the rear right pneumatic control valve $PCV_{RR}$ to be closed. At time t17 (258.4 sec), the exhaust valves $E_1$, $E_2$ are opened to allow the compressed air in the tire supply line TSL to be vented to atmosphere. At time t18 (approximately 258.8 sec), the pressure sensor 35 detects a pressure equal to Patm, and therefore the system can return to stand-by at time t18. The rear tires $T_{RL}$, $T_{RR}$ have now been deflated to the target pressure of approximately 2.5 bar sensed, which corresponds to 1.5 bar gauge.

Figure 15:
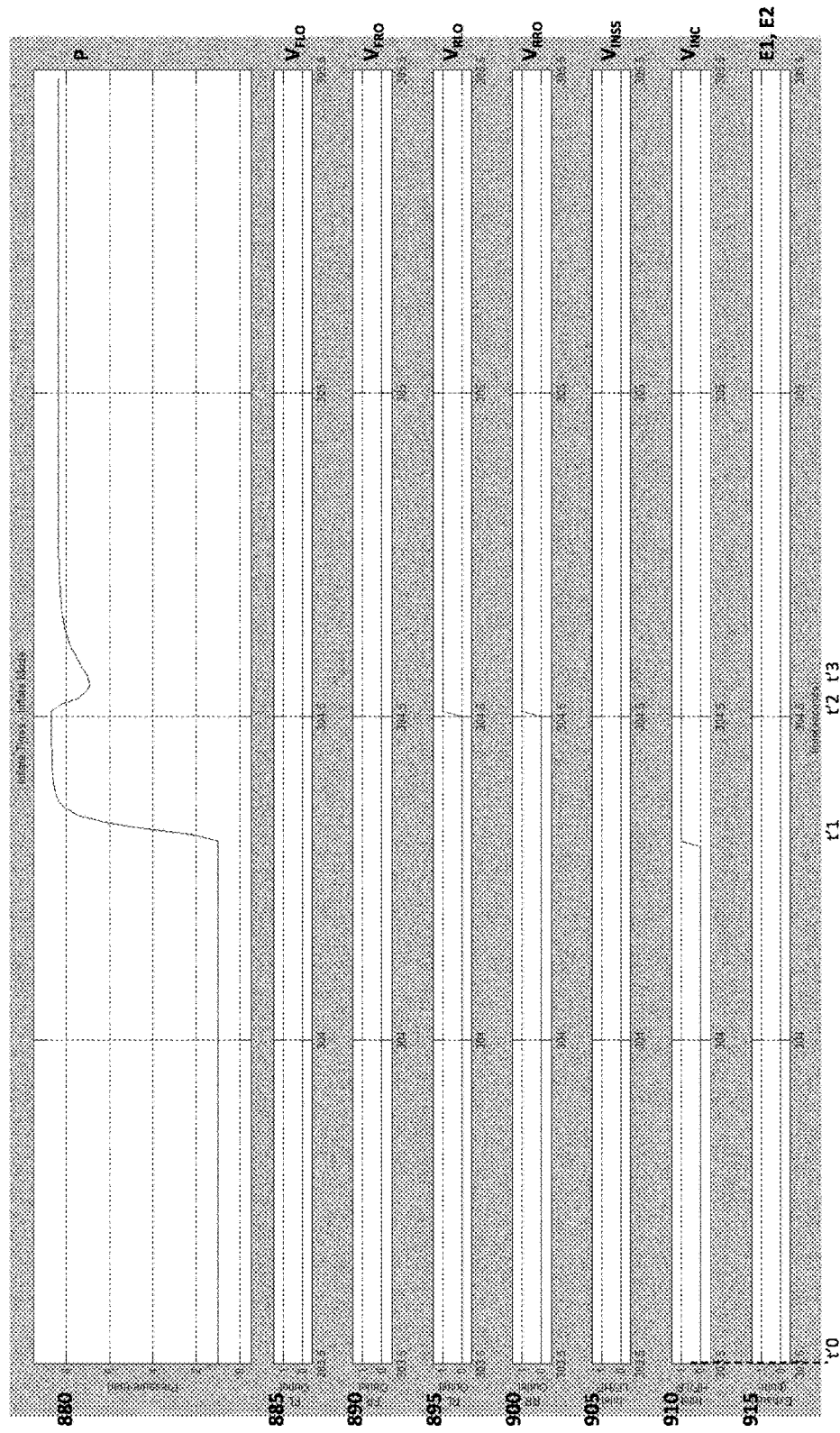
FIG. 15 is a group of graphs showing: a) the pressure measured by a tire pressure monitoring sensor; and b) the status (open=1; closed=0) of the valves of the CTIS described herein, through part of a tire inflation cycle concerning the rear axle.

Referring now to FIG. 15, a first graph 880 in FIG. 15 shows the pressure measured by the pressure sensor 35 during a preparatory part of a tire inflation cycle from an initial time t0 (303.5 sec). At t'1 (304.3 sec), the ECU 15 causes the first compressed air source 5 to deliver compressed air by opening the inlet valve $V_{INC}$, as shown by a seventh graph 910 in FIG. 15. Pressure starts to build up in the gallery 33 of the valve block 3. At time t'2 (304.5 sec), the rear outlet valves $V_{RLO}$, $V_{RRO}$ are opened by the ECU 15, as shown by a fourth and a fifth graph 895, 900 in FIG. 15. Compressed air from the compressor 9 can therefore flow into the tire supply lines $TSL_{RL}$, $TSL_{RR}$ relating to the rear axle of the vehicle VH. A dip in the measured pressure is sensed by the pressure sensor 35 at t'3 (304.6 sec) as a consequence of this flow of compressed air into the rear tire supply lines $TSL_{RL}$, $TSL_{RR}$. Subsequently, the pressure sensed by the pressure sensor 35 increases again due to additional compressed air input to the rear tire supply lines $TSL_{RL}$, $TSL_{RR}$ by the compressor 9. The system is now ready for inflating the rear tires $T_{RL}$, $T_{RR}$. The front outlet valves $V_{FLO}$, $V_{FRO}$ are not involved in this procedure (i.e. these valves remain closed), as shown by a second and a third graph 885, 890 in FIG. 15. Likewise, the second (denoted LF/HP in FIG. 15) inlet valve $V_{INSS}$ and the exhaust valves $E_1$, $E_2$ are not involved, as shown by respectively a sixth and an eighth graph 905, 915 in FIG. 15.

Figure 16:
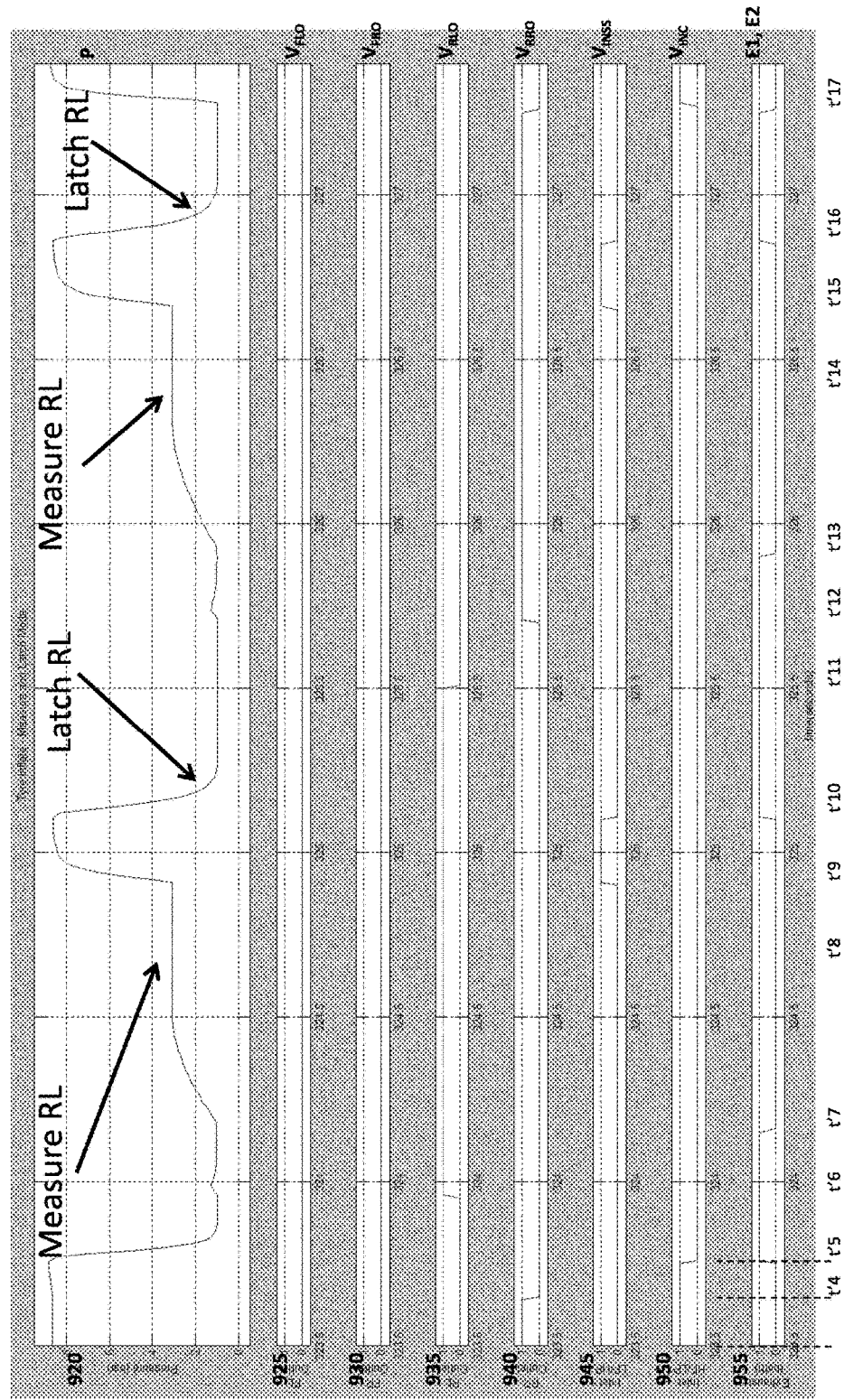
FIG. 16 is a group of graphs showing: a) the pressure measured by a tire pressure monitoring sensor; and b) the status (open=1; closed=0) of the valves of the CTIS described herein, through another part of the tire inflation cycle referred to in FIG. 15.

Inflation is achieved by opening and closing the second inlet valve $V_{INSS}$ (i.e. the LF/HP valve) so as to toggle the rear left and rear right pneumatic control valves $PCV_{RL}$, $PCV_{RR}$ to an open state (this is not shown in FIG. 15 or 16). Compressed air can thus flow from the first compressed air source 5 to the relevant tire cavities for a predetermined time period. The pressure sensor 35 senses the pressure of the compressed air supplied from the first compressed air source 5. As described herein, the target tire pressure is achieved by controlling the inflation time. The tire inflation ends for the rear left tire $T_{RL}$ at a time not shown in FIGS. 15 and 16.

Referring now to FIG. 16, the tire inflation ends for the rear right tire $T_{RR}$ at time t'4 (323.7 sec) shown in FIG. 16, when the rear right outlet valve $V_{RRO}$ is closed as shown by a fifth graph 940 in FIG. 16. The system is then reconfigured to measure the pressure in the rear left tire cavity. This procedure starts in FIG. 16 at time t'5 (232.8 sec), when the first inlet valve $V_{INC}$ (denoted HF/LP valve in FIG. 16) is closed (thereby cutting out flow of compressed air from the compressor 9) as shown by a seventh graph 950 in FIG. 16, and the exhaust valves E1, E2 are opened to vent out excess compressed air from the relevant tire supply lines $TSL_{RR}$, $TSL_{RL}$ as shown by an eighth graph 955 in FIG. 16. At time t'6 (323.9 sec), the rear left outlet valve $V_{RLO}$ is opened to put the rear left tire supply line $TSL_{RL}$ in communication with the inflated rear left tire cavity, as shown by a fourth graph 935 in FIG. 16. Soon after time t'7 (234.2 sec), the exhaust valves $E_1$, $E_2$ are closed to prevent air from the rear left tire $T_{RL}$ from venting out thereby deflating the previously inflated rear left tire $T_{RL}$. The rear left tire supply line $TSL_{RL}$ fills with compressed air. The pressure in the rear left tire supply line $TSL_{RL}$ is now representative of the pressure in the rear left tire $T_{RL}$ which can thus be estimated via the pressure measured by the pressure sensor 35 in the gallery 33 of the valve block 3 at time t'8 (324.7 sec), as shown by a first graph 920 in FIG. 16. If the pressure achieved is correct, the second inlet valve $V_{INSS}$ (denoted LF/HP in FIG. 16) can be opened and closed to isolate the rear left tire cavity. This happens in FIG. 16 between time t'9 (324.9 sec) and time 110 (325.2 sec), as shown by a sixth graph 945 in FIG. 16. This procedure closes the rear left pneumatic control valve $PCV_{RL}$ to isolate the rear left tire cavity. At time 110, the exhaust valves $E_1$, $E_2$ are also opened to vent out excess air from the rear left tire supply line $TSL_{RL}$. Since the target pressure (2.5 bar) has been reached, the procedure can be terminated for the rear left tire $T_{RL}$. This happens, in FIG. 16, at 111 (325.5 sec) when the rear left outlet valve $V_{RLO}$ is closed. The procedure is then repeated for the rear right tire $T_{RR}$. The front outlet valves $V_{FLO}$, $V_{FRO}$ are not involved in this procedure (i.e. they remain permanently closed), as shown by a second and a third graph 925, 930 in FIG. 16. At time t'12 (325.7 sec), the rear right outlet valve $V_{RRO}$ is opened and at time t'13 (325.9 sec) the exhaust valves $E_1$, $E_2$ are closed to isolate the rear right tire supply line $TSL_{RR}$ so that the rear right tire pressure can be measured. The measurement is taken by the pressure sensor 35 at time t'14 (326.4 sec). The second inlet valve $V_{INSS}$ is then opened and closed at times t'15 (326.7 sec) and t'16 (329.9 sec) respectively to operate the rear right pneumatic control valve $PCV_{RL}$ to seal the rear right tire cavity. At time t'16, the exhaust valves $E_1$, $E_2$ are also opened to vent excess compressed air from the rear right tire supply line $TSL_{RR}$. At time t'17 (237.3 sec) approximately, the rear right outlet valve $V_{RR}$ and the exhaust valves $E_1$, $E_2$ are closed to terminate the procedure.

An additional control strategy implemented by the CTIS 1 described herein is described below. This control strategy relates to a target tire pressure over-shooting strategy.

Over the life of the vehicle VH, the various joints in the compressed air paths between the compressed air sources and the tire cavities in the CTIS 1 may develop minor leaks due to normal, ageing wear. As a consequence, during a tire inflation or deflation operation the CTIS 1 may, respectively, undershoot or overshoot the target tire pressures. This is due to the presence of such leaks, or losses, whereby during a tire inflation operation some of compressed air destined to the tire cavities is instead vented from the CTIS 1 to atmosphere due to one or more leaks. During a tire deflation operation, an additional quantity of compressed air may vent from the CTIS 1 to atmosphere due to these potential leaks.

Since the CTIS 1 described herein is based on an open loop system architecture (i.e. there is no feedback means to feedback to the ECU 15 the amount of compressed air being actually or instantaneously transferred to the tire cavities as the tires are inflated or being actually or instantaneously vented to atmosphere as the tires are deflated), a tire inflation or deflation operation is terminated after a given/predetermined tire inflation or deflation time has elapsed. As described earlier, these given/predetermined times are retrieved by the ECU 15 from the look-up table. Subsequently, the tire pressures are measured for each of the tires T involved in the inflation or deflation procedures to check whether the tire inflation or deflation has delivered the target tire pressures. In this open loop system, the ECU 15 is only programmed to check that the inflation or deflation time is equivalent to the inflation or deflation time retrieved from memory and to successively verify the tire pressure and close the pneumatic control valves PCV by activating respectively the pressure measurement procedure and the pneumatic control valve closure procedure as described herein. These events terminate the overall tire inflation or deflation cycle/procedure.

In both scenarios (tire inflation or deflation), it is undesirable to have to inflate the tires further in a subsequent step to reach the target tire pressures, since this would require at least another inflation or deflation cycle (i.e. inclusive of the tire pressure measurement and pneumatic control valve closure operations). A further tire inflation cycle is especially undesirable since it could require a further activation of the compressor 9 via the electric motor 27 with related noise. Further, any additional inflation or deflation cycle/procedure equates to additional energy consumed, potential additional noise emitted by the CTIS 1, additional time required to reach the target pressures, additional valve cycles for one or more of the various valves of the CTIS 1 and, in particular, the pneumatic control valves PCV. Once the tire pressures have been measured after inflation or deflation the system is required to cycle through the pneumatic valve closure procedure before the valves can be brought back to the tire inflation configuration. Then the pneumatic control valves PCV are required to cycle again through the pressure check/measurement configuration before the pneumatic control valves PCV can be closed/latched to terminate the inflation or deflation cycles/procedures as earlier described. An additional problem is that if the required additional inflation time is particularly short, initialization of the compressor 9 and the air dryer unit 29 may be problematic and the CTIS 1 may consequently generate a system fault as illustrated by System Fault status 25 illustrated in FIG. 2.

In the described embodiment, the ECU 15 of the CTIS 1 is programmed to provide compensation to try to address the aforementioned problem. In particular, the ECU 15 is programmed to ensure that at the end of the inflation or deflation operations (identified by flow of compressed air to or from one or more tires T) the tire pressures are each greater than the target tire pressures. In other words, the ECU 15 is programmed so as always to include a safety overshooting or compensation margin at the end of the inflation or deflation operations/times. As a consequence, the ECU 15 is programmed to overshoot the target tire pressure in the case of tire inflation and to undershoot the target tire pressure in the case of tire deflation. The overshooting tire pressure (or compensation tire pressure) corresponds to the target tire pressure plus a margin.

In an example, the ECU 15 retrieves from the look-up table an inflation time equal to 60 sec and adds a safety margin of 6 sec to overshoot the target tire pressure thereby inflating above the target tire pressure. In another example, the ECU 15 retrieves from memory a deflation time of 100 sec and subtracts a safety margin of 15 sec to undershoot the target tire pressure thereby under-deflating the relevant tire T. Once the target tire pressure have been overshot or undershot by the CTIS 1 so as to avoid further one or more full tire inflation/deflation cycles, the ECU 15 is programmed to adjust the target tire pressure during the following Measure procedure 515 (examples of which as shown in FIGS. 5 to 7) to adjust the tire pressure to the target pressure. During the Measure procedure 515, the CTIS 1 can adjust the tire pressure as required by simply opening the exhaust valves $E_1$, $E_2$ until the target tire pressure has been achieved. The CTIS 1 is therefore no longer required to undertake one or more additional inflation cycles.

Criteria can be developed to estimate, or calculate, the safety margin (also referred to herein as the over-shooting margin or the compensation margin). In particular, it would be preferable to be able to estimate or calculate safety margins which allow the system to overshoot (in the case of tire inflation) or undershoot (in the case of tire deflation) the target tire pressure as little as possible while at the same time resulting into inflation above or slightly above the target tire pressure at the end of the inflation or deflation operation/ time. In some embodiments, the over-shooting margin is established on the basis of a worst-case scenario which is associated to a maximum of compressed air loss through the joints. In this case, the safety margin equals to the additional inflation time, or to the subtracted deflation time, as the case may be, which is required to compensate for the maximum of compressed air loss associated with the worst-case scenario. As it will be understood, a variety of worst-case scenarios could be hypothesized and, accordingly, a range of maximum losses could be used. For example, the worst case scenario may be estimated based on the possible number of points at which a leak may occur and the estimated maximum leak at each location. Empirical testing may be used to obtain data from which to estimate the maximum leak at each location. In order to determine the condition of the seals the safety margin may use a worst case scenario of the expected air leakage after a predetermined usage, for example after 100,000 miles. If, using this valve, prior to the vehicle reaching 100,000 miles usage, after the first part of the inflation the pressure is below the target pressure, this may be indicative of significant seal deterioration outside of expected parameters and a notification may be issued to the driver, for example through a vehicle HMI.

The compensation margin could be calculated as the additional inflation time, or to the subtracted deflation time, as the case may be, which is required to compensate for the maximum loss of compressed air loss through one or more of the rotary air couplings VH.

It is also predicted that the aforementioned compressed air losses may depend on vehicle age or mileage. Accordingly, the over-shooting margin could be dependent on, or be a function of, vehicle age or mileage.

It is also conceivable to use the CTIS 1 to measure the air loss, or air loss rates, through the joints at one or more times throughout the life of the vehicle. In this case, the CTIS 1 is configured to convert a measured discrepancy between the target tire pressure and the current tire pressure for one or more of the tires following a tire inflation or deflation procedure into an estimated air loss or air loss rate. In particular, the CTIS 1 could be configured to individually test the rotary air couplings RAC in this manner to estimate the air loss, or air loss rate, through each of the rotary air couplings RAC at one or more times. The resulting compensation margins could then be applied to the tires individually, or for each axle, if appropriate. Alternatively, the outlet valves $V_O$ may be opened, the PCV valves closed, the exhaust valves $E_1$, $E_2$ closed, and pressure applied by opening and closing the first inlet valve $V_{INC}$ to pressurize the air-path to the tire. The pressure sensed at the pressure sensor 35 can then be observed and any reduction can be assumed to be as a result of system leakage losses between the valve block 3 and the pneumatic control valves PCV. The outlet valves $V_O$ may be individually opened to estimate the losses in the air path to each tire T.

It is also conceivable to use combinations of the above described criteria or methodologies for the calculation or estimation of the compensation margin or margins, or to refine the above described criteria or methodologies in various manners which are however not described herein in detail.

The invention claimed is:

1. A processor for controlling operation of a central tire inflation system to inflate each of a plurality of tires of a vehicle from a current tire pressure to a target tire pressure, the tires being provided on a front axle and a rear axle, said processor being configured to generate one or more output signals to cause the central tire inflation system to supply compressed air to inflate each tire from said current tire pressure to said target tire pressure in at least first and second stages; the processor being configured to control the central tire inflation system to supply compressed air to each tire during said first stage to inflate the tire from said current tire pressure to an intermediate tire pressure; and to supply compressed air to said tire during said second stage to inflate the tire from said intermediate tire pressure to said target tire pressure; wherein said first and second stages are discrete from each other; wherein the processor is configured to control the central tire inflation system to implement a staggered tire inflation strategy whereby each tire on the rear axle is inflated to the target tire pressure before each tire on the front axle are inflated to the target tire pressure.

2. A processor as claimed in claim 1, wherein the processor is configured to control the central tire inflation system to implement the staggered tire inflation strategy such that each tire on the rear axle is inflated to the intermediate tire pressure before each tire on the front axle is inflated to the intermediate tire pressure.

3. A processor as claimed in claim 1, wherein the processor is configured to receive an input signal representative of the current tire pressure of the tire before the first stage commences and/or before the second stage commences.

4. A processor as claimed in claim 1, wherein the processor is configured to control the central tire inflation system to supply compressed air for a first time interval during said first stage, and to supply compressed air for a second time interval during said second stage.

5. A processor as claimed in claim 1, wherein said intermediate tire pressure is at least substantially equal to or greater than a minimum tire pressure threshold value for on-road driving.

6. A processor as claimed in claim 1, wherein the processor is configured to control the central tire inflation system to inflate each of the tires of the vehicle to said intermediate tire pressure or to respective intermediate tire pressures, and subsequently to inflate each of the tires of the vehicle to said target pressure or to respective target tire pressures.

7. A processor as claimed in claim 1, wherein the processor is configured to control the central tire inflation system to supply compressed air from a first compressed air source to inflate each tire of the vehicle.

8. A processor as claimed in claim 1, wherein the processor is configured to control the central tire inflation system to generate a pneumatic control signal for controlling a pneumatic control valve provided in a tire supply line.

9. A processor as claimed in claim 1, operably coupled to a human to machine interface of the vehicle.

10. An electronic controller for controlling a central tire inflation system, the electronic controller comprising a processor as claimed in claim 1.

11. A central tire inflation system comprising the electronic controller claimed in claim 10.

12. A vehicle comprising a central tire inflation system as claimed in claim 11.

13. A method of operating a central tire inflation system to inflate each of a plurality of tires provided on a front axle and a rear axle of a vehicle from a current tire pressure to a target tire pressure, the method comprising the steps of: using a processor, generating at least one signal to cause the central tire inflation system to supply compressed air to inflate each tire to an intermediate tire pressure in a first stage, and to cause the central tire inflation system subsequently to supply compressed air to inflate each tire to the target tire pressure in a second stage, wherein a staggered tire inflation strategy is implemented in which the tires on the rear axle are inflated to the target tire pressure before the tires on the front axle are inflated to the target tire pressure.

14. A method as claimed in claim 13, wherein a staggered tire inflation strategy is implemented in which the tires on the rear axle are inflated to the intermediate tire pressure before the tires on the front axle are inflated to the intermediate tire pressure.

15. A computer program product comprising a non-transitory computer readable storage medium including computer readable program code, wherein the computer readable program code when executed causes a central tire inflation system to inflate a tire according to the method claimed in claim 13.

* * * * *